United States Patent [19]
Yoshimura et al.

[11] Patent Number: 5,229,891
[45] Date of Patent: Jul. 20, 1993

[54] TRACKING CONTROL SYSTEM USING SINGLE FREQUENCY PILOT SIGNAL

[75] Inventors: Katsuji Yoshimura; Koji Takahashi; Kenichi Nagasawa; Shinichi Yamashita, all of Kanagawa; Motokazu Kashida, Tokyo; Mitsuhiro Otokawa, Kanagawa, all of Japan

[73] Assignee: Canon Kabushiki Kaisha, Tokyo, Japan

[21] Appl. No.: 831,632

[22] Filed: Feb. 7, 1992

Related U.S. Application Data

[60] Continuation of Ser. No. 549,477, Jul. 6, 1990, abandoned, which is a division of Ser. No. 116,523, Nov. 3, 1987, Pat. No. 4,951,162.

[30] Foreign Application Priority Data

| | | | |
|---|---|---|---|
| Nov. 6, 1986 | [JP] | Japan | 61-264998 |
| Nov. 7, 1986 | [JP] | Japan | 61-265897 |
| Nov. 7, 1986 | [JP] | Japan | 61-265898 |
| Nov. 10, 1986 | [JP] | Japan | 61-267048 |
| Nov. 10, 1986 | [JP] | Japan | 61-267049 |
| Nov. 11, 1986 | [JP] | Japan | 61-268183 |

[51] Int. Cl.$^5$ .................. G11B 5/02; G11B 5/588
[52] U.S. Cl. ............. 360/18; 360/77.14; 360/77.15
[58] Field of Search .......... 360/18, 19.1, 27, 32, 360/70, 64, 10.2, 73.04, 73.09, 73.11, 73.12, 77.01, 77.02, 77.07–77.15

[56] References Cited
U.S. PATENT DOCUMENTS

| | | | |
|---|---|---|---|
| 4,110,799 | 8/1978 | Bergmans et al. | 360/77.14 |
| 4,416,002 | 11/1983 | Oguino et al. | 360/77.07 |
| 4,432,026 | 2/1984 | Coleman, Jr. | 360/77.14 |
| 4,490,756 | 12/1984 | Dost et al. | 360/77.11 |

FOREIGN PATENT DOCUMENTS 60-237681  11/1985  Japan ..................... 360/64

*Primary Examiner*—Joseph Ruggiero
*Assistant Examiner*—Steven R. Garland
*Attorney, Agent, or Firm*—Robin, Blecker, Daley & Driscoll

[57] ABSTRACT

In an apparatus for recording an information signal on a recording medium forming many parallel tracks on the medium and for reproducing the information signal from the medium, a tracking control system is arranged to record a pilot signal of a given frequency along with the information signal in the first of the many tracks; to have the pilot signal also recorded in second and third tracks adjoining the first track on both sides thereof but at pilot signal phases shifted from the pilot signal phase of the first track to equal degrees in the directions opposite to each other at parts of the second and third tracks aligned perpendicularly to the longitudinal direction of the first track; and, in reproducing the information signal, the position of the recording medium and that of a reproducing head relative to each other are controlled on the basis of the pilot signal of the given frequency reproduced by the reproducing head from the first track along with the information signal.

8 Claims, 16 Drawing Sheets

FIG.15(A)
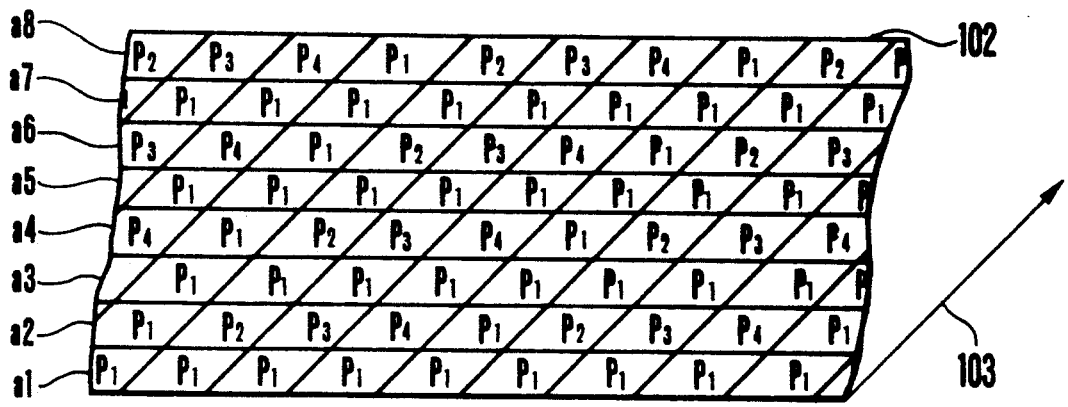
FIG.15(B)
FIG.16(A)
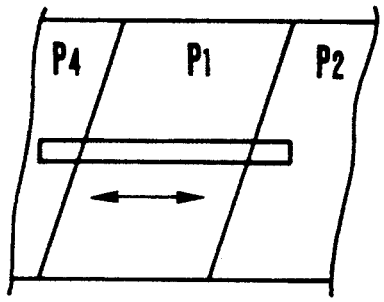
FIG.16(B)
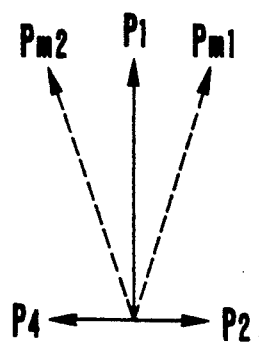

TRACKING CONTROL SYSTEM USING SINGLE FREQUENCY PILOT SIGNAL

CROSS-REFERENCE TO RELATED APPLICATIONS

This application is a continuation of application Ser. No. 549,477, filed Jul. 6, 1990, now abandoned, which is a division of application Ser .No. 116,523, filed Nov. 3, 1987, which issued as U.S. Pat. No. 4,951,162 on Aug. 21, 1990.

BACKGROUND OF THE INVENTION

1. Field of the Invention

This invention relates to a tracking control system included in a system for recording an information signal by forming many parallel tracks on a recording medium and for reproducing the information signal from the medium.

2. Description of the Related Art

The systems of the above stated kind have recently come to be often arranged to record and reproduce various information signals by digitizing them. The frequency band of the digitized information signals is much wider than that of analog information signals. The wider band necessitates high density magnetic recording or the like and thus, for example, does not allow the system to form the recording tracks at a wide pitch.

In reproducing the digital information signal, on the other hand, the probability of occurrence of a code error greatly increases in the event of a tracking error. The code error may be correctable by means of a so-called error correction code or the like. However, it is not desirable to increase the correcting power of the error correction code as it increases redundancy. It is, therefore, an important theme for the systems of this kind to enhance the tracking precision thereof.

Meanwhile, typical tracking control methods which have heretofore been employed for the system of this kind include a method called a CTL method. In accordance with this tracking control method, a control signal (hereinafter referred to as a CTL signal) which is of a frequency corresponding to the track pitch is recorded at an edge part of a tape-shaped recording medium by means of a fixed head; and a tracking error signal is obtained by reproducing the CTL signal and by comparing the phase of the reproduced CTL signal with that of a reference signal. In another tracking control method which is called a four frequency method, pilot signals of four different frequencies are superimposed on information signals and recorded on the tape-shaped recording medium one after another, one in each of tracks; and, during a reproducing operation, a tracking error signal is obtained by comparing the levels of the pilot signals reproduced from two tracks adjacently located on both sides of a track which is mainly under control.

In the case of the CTL method, the tracking control is not accomplished on the basis of information obtained from the recording tracks. In the event of impaired linearity of the tracks or a mounting error of a CTL signal reproducing head, therefore, it becomes impossible to obtain an accurate tracking control signal by this method.

The four frequency method solves the problem presented by the CTL method. In the four frequency method, however, the need to superimpose as many as four different kinds (frequencies) of pilot signals upon the information signal imposes a limit on the frequency band of the information signal. In the case of a digital signal in particular, it is impossible to have the pilot signals of as many as four different frequencies superimposed on the signal as the lower end of the recording band of the digital signal comes as low as 100 KHz or thereabout.

In recording digital video signal or a wide-band video signal having a large amount of information per unit time, for example, it becomes difficult to record it in a single channel. In such a case, therefore, it has been practiced, for example, to record one field portion of the video signal by dividing it into a plurality of tracks through a multi-channel arrangement. Such a recording system then necessitates a reproducing system to make a discrimination as to which of the tracks has the record of one of the video signal channels. If that discrimination is not possible, the divided video signal cannot be recombined. To obviate the necessity of various switching circuits for discrimination of recorded signal channels, it is preferable to use an n number of reproducing heads in reproducing a video signal divided into n channels.

In that case, the n number of reproducing heads must be controlled to have them accurately and reliably trace only the track that has the video signal of an applicable channel recorded therein. Further, in case that the number of the heads is n/i (i: an integer), each of the heads must be arranged to trace a specific track allotted to the applicable signal channel to be reproduced so long as a plurality of reproducing heads are in use.

This requirement can be met, for example, by recording the CTL signal in a cycle of n track pitches according to the above stated CTL method. Whereas, in the case of the four frequency method, the method meets the requirement only in the event of n=4 or 2.

In case that a VTR is arranged to record a digital signal by simultaneously using a plurality of heads, there arises the following problems:

FIGS. 1 and 2 of the accompanying drawings illustrate the problems of the prior art. FIG. 1 shows the head arrangement of a VTR which is arranged to use a plurality of heads at the same time. FIG. 2 shows the tracing loci of the heads obtained on a magnetic tape employed as a recording medium. Referring to FIG. 1, rotary heads h1, h2, h3, h4, h5 and h6 are mounted on a rotary cylinder D at a phase difference of 60 degree from each other. These heads are disposed in the same position in the direction of the rotation axis of the rotary cylinder D. They are arranged to trace the surface of the magnetic tape T as shown in FIG. 2. The tape T is wrapped at least 180 degrees round the circumferential surface of the rotary cylinder D by means of tape guide posts g1 and g2.

In respect of tracking control to be accomplished by using a signal reproduced by the rotary head with the VTR arranged as described above, it is generally practiced to use only the signals that are reproduced by some of the plurality of heads which are simultaneously tracing the tape. Assuming that signals reproduced by the heads h2 and h5 are to be used for tracking control among the heads h1 to h6 of FIG. 1, for example, it is not always possible to have other heads accurately trace applicable tracks because of head mounting errors, even if the tracking control is perfectly accomplished. The head mounting errors tend to result in faulty tracing positions as indicated by broken lines in FIG. 2.

Assuming that the heads h1, h2 and h3 are now in tracing positions as shown by the broken lines in FIG. 2, in accordance with the above stated method for tracking control, the travel of the magnetic tape is controlled in such a way as to cause them to trace the parts of the tape as shown by full lines in FIG. 2. In that instance, however, the tracking control causes the head h3 to further deviate from a track tr3 which is to be traced. In the case of an analog signal, the head 3 may still be able to give some amount of a reproduced signal if the signal is azimuth recorded. In reproducing a digital signal, however, the reproduction of the signal becomes hardly possible as the code error would be increased by the tracking control. A digital signal permits a discrimination between "1" and "0" if a reproduced signal is obtainable at a certain level. Then, with an error correcting process, etc., carried out, the reproduced signal can be obtained in a nearly integral state. In reproducing a digital signal, therefore, the positions shown by the broken lines in FIG. 2 are better than the positions shown by the full lines in terms of tracking control. Whereas, the above stated tracking control method causes the head to be shifted from the broken line position to the full line position in such a manner that is contrary to the above stated principle of digital signal reproduction.

SUMMARY OF THE INVENTION

Such being the background, a principal object of this invention is to provide a novel tracking control system which solves the problems of the prior art.

It is a more specific object of this invention to provide a tracking control system which is capable of accurately detecting a tracking error deviating from recording tracks and obtaining a tracking control signal from any part of the tracks without bringing about any adverse effect on information signal recording or reproduction.

Under this object, a tracking control system arranged as an embodiment of this invention comprises pilot signal generating means for generating a pilot signal at a predetermined frequency; recording means for recording an information signal and the pilot signal in many parallel tracks on a recording medium; timing control means for controlling the pilot signal generating timing of the pilot signal generating means in such a manner that, in relation to the phase of the pilot signal recorded in the first of the many tracks, the phases of the pilot signal recorded in second and third tracks which adjoin the first track on both sides thereof are shifted to equal phasic degrees in opposite directions at the parts of the second and third tracks aligned perpendicularly to the longitudinal direction of the first track; reproducing means including at least one reproducing head for reproducing the information signal and the pilot signal from the recording medium; reference signal generating means for generating a reference signal of the same frequency as that of the pilot signal; detection means for detecting a phase difference between the pilot signal reproduced by the reproducing means and the reference signal; and tracking control means for controlling the positions of the reproducing head and the recording medium relative to each other.

The above and other objects and features of the invention will become apparent from the following detailed description of embodiments thereof taken in connection with the accompanying drawings.

BRIEF DESCRIPTION OF THE DRAWINGS

FIGS. 15(A) and 15(B) show the recording pattern of the digital VTR embodying the tracking control method of this invention.

FIGS. 16(A) and 16(B) show the principle of tracking control to be performed by the embodiment of this invention.

DETAILED DESCRIPTION OF THE PREFERRED EMBODIMENTS

Figure 1:
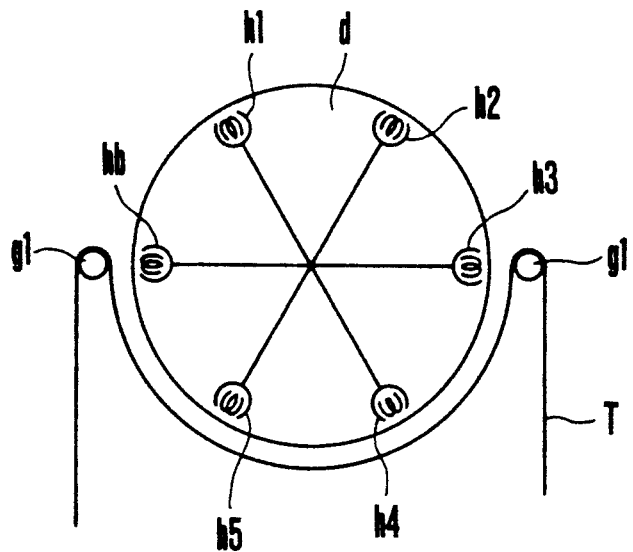
FIG. 1 shows the head arrangement of the conventional VTR of the kind simultaneously using a plurality of heads.
Figure 2:
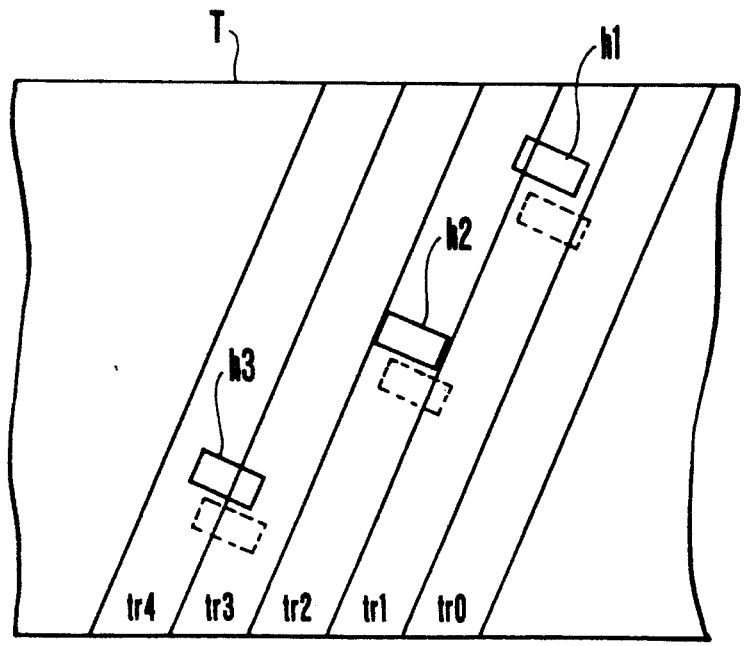
FIG. 2 shows tracing loci of the heads of FIG. 1 obtained on a magnetic tape.
Figure 3:
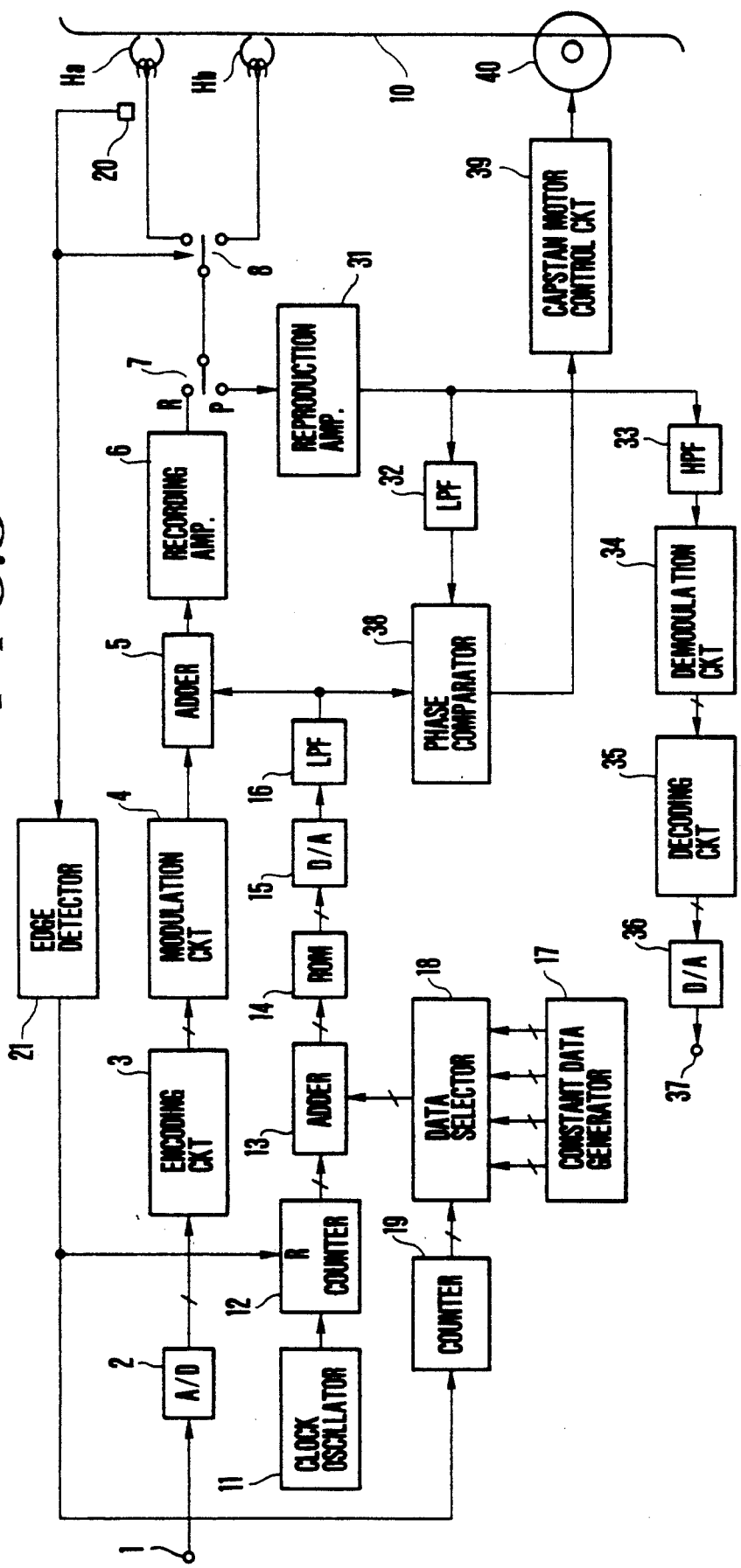
FIG. 3 is a block diagram showing the arrangement of a digital VTR arranged as an embodiment of this invention.

The following describes a tracking control system embodying this invention. In this case the invention is applied to a two-rotary-head helical scanning type digital VTR. The digital VTR performs a recording operation in the following manner. Referring to FIG. 3 which shows the arrangement of the VTR in a block diagram, an analog video signal which comes to a video signal input terminal 1 is digitized by an analog-to-digital (hereinafter referred to as A/D) converter 2. The digitized signal is supplied to an encoding circuit 3 to have an error detecting and correcting code and other redundant data such as additional information added thereto. The signal is further converted into a data arrangement suited for error correction. The signal thus processed is supplied to a modulation circuit 4. The circuit 4 converts the signal into a signal form suited for magnetic recording through, for example, the so-called mapping encoding process or the like. As a result, the modulation circuit 4 produces a signal which has its low band component suppressed. In the case of this embodiment, a pilot signal of a single frequency is arranged to be superimposed on the recording video signal at the band thereof which is suppressed by the modulation circuit 4. An adder 5 adds the pilot signal to the digital video signal which is produced from the modulation circuit 4.

Figure 4:
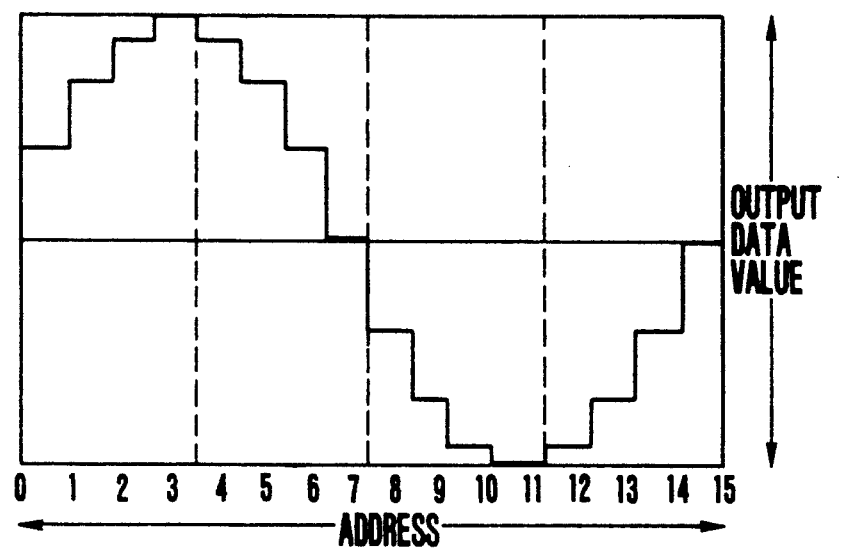
FIG. 4 shows input and output data of the table of a ROM shown in FIG. 3.

A pilot signal generating part for generating the pilot signal of the single frequency is arranged as follows: The single frequency of the pilot signal is arranged to be in a sinusoidal wave form and within a range that does not affect the digital video signal, such as a range from several tens of KHz to one hundred and several tens of KHz. The sinusoidal wave is obtained by reading data stored within a ROM table 14. The relation of address data supplied to the ROM table 14 to the output data is as shown in FIG. 4. Data which corresponds to a stepwise wave form as shown in FIG. 4 can be generated by having the data to be supplied to the ROM table 14 changed one by one from 0 to N−1 (15 in this case) at intervals of a given period. The data which is thus obtained is converted into an analog signal by a digital-to-analog (hereinafter referred to as D/A) converter 15. The output of the D/A converter 16 is supplied to an LPF (low-pass filter) 16 to have any harmful harmonic removed thereby. A sinusoidal wave of a single frequency is thus obtained. The ROM table 14 generates, in N steps consisting of steps from 0 to N−1, data corresponding to one cycle of the sinusoidal wave. Therefore, when the address data is at N/2 and N/4, it corresponds to phases $\pi$ and $\pi/2$. Therefore, assuming that the necessary frequency of the pilot signal is fp, the address is to be renewed every $1/(N \times fp)$ sec.

Again referring to FIG. 3, an oscillator 11 is arranged to generate a clock signal having a frequency of $N \times fp$. The pulses of this clock signal are counted by a counter 12 which is arranged to count up to a maximum value of N−1 (or a 4-bit counter in the case of N=16). The output data of the counter 12 is supplied as address data through an adder 13 to the ROM 14.

Control over the phase of the pilot signal is performed as follows: Assuming that the phase of the output of the ROM 14 is to be shifted by $\pi/2$, the output should be shifted as much as N/4 address as obvious from the foregoing description. Therefore, a constant data generator 17 is arranged to generate four data for 0, N/4, N/2 and 3N/4 in parallel to each other. A data selector 18 is arranged to selectively supply the four data from the data generator 17 to the adder 13. This arrangement enables the ROM 14 to produce therefrom four different pilot signals which are of the same frequency but have their phases differ by $\pi/2$ from each other.

A reference numeral 20 denotes rotation phase detector. The detector 20 is arranged to detect the phases of the rotary heads Ha and Hb and to generate a rectangular wave signal (hereinafter referred to as a PG signal) which indicates the change-over timing of the recording or reproducing heads. The counter 12 is arranged to be reset by timing pulses which indicate the timing of the edge of this PG signal. In other words, the counter 12 is thus reset at the timing at which the heads Ha and Hb begin to trace each of the recording tracks. Meanwhile, another counter 19 is a two-bit counter arranged to count the timing pulses. The output data of the counter 19 is shifted every time the head position changes from one track to another. The output data of the data selector 18 then change from one to another in such a way as: 0 - N/4 - N/2 - 3N/4 -0. Thus, the phase of the pilot signal supplied to the adder 5 shifts stepwise by $\pi/2$ every time the heads Ha and Hb begin to trace one of the tracks.

The pilot signal which is obtained in the above stated manner is frequency multiplexed with the digital video signal at the adder 5. The output of the adder 5 is supplied to a recording amplifier 6, to a terminal on the recording side R of a recording/reproduction change-over switch 8 and then to the heads Ha and Hb. The heads then record these signals on a magnetic tape 10. The above stated head change-over switch 8 is arranged to operate under the control of the PG signal.

Figure 5:
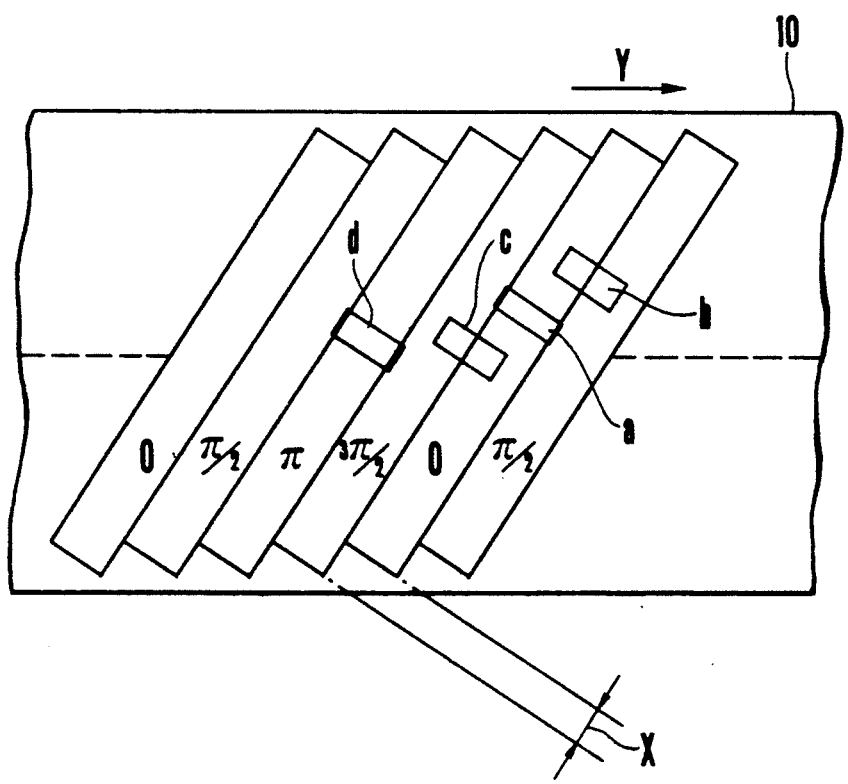
FIG. 5 shows the recording pattern of the digital VTR of FIG. 3.

FIG. 5 shows a recording pattern which results from the above stated recording operation on the magnetic tape 10. In FIG. 5, reference symbols 0, $\pi/2$, $\pi$ and $3\pi/2$ denote the different phases of the pilot signal. As mentioned in the foregoing, in accordance with the pilot signal generating method, the initial phase for each track shifts every time the head position shifts from one track to another. To keep this condition unvarying throughout the whole track area, the number of revolution of each head and a tape moving velocity are determined in such a manner that the recording wave length of the pilot signal becomes 1/an-integer of a shifting extent X from one track to a next track (see FIG. 5).

The reproducing operation of the embodiment is as follows: The pilot signal and the digital video signal reproduced by the heads Ha and Hb are supplied via the head change-over switch 8 and a terminal P on the reproduction side of the switch 7 to a reproduction amplifier 31. After amplification by the amplifier 31, these signals are supplied to an LPF 32 and an HPF 33.

The digital video signal is separated by the HPF 33 and is digitally demodulated by a demodulation circuit 34. The demodulated video signal is supplied to a decoding circuit 35. The circuit 35 performs a process corresponding to that of the above stated encoding circuit 3 and also performs other processes including error correction, etc. A reproduced digital video signal thus obtained is supplied to a D/A converter 36 to be converted into an analog video signal. The analog video signal is then produced from an output terminal 37.

Meanwhile, the LPF 32 separates the pilot signal. The pilot signal is then supplied to a phase comparator 38 to have its phase compared with a pilot signal which is obtained via an LPF 16 in the same manner as in recording. Hereinafter the pilot signal obtained from the LPF 16 during reproduction will be called a reference pilot signal for distinction from the reproduced pilot signal.

The recording track under tracking control changes from one track to another among the tracks having the record of the pilot signal at different phases in the order of 0 - $\pi/2$ - $\pi$- $3\pi/2$ according as the phase of the reference e pilot signal produced from the LPF 16 shifts its phase in the order of 0 - $\pi/2$ - $\pi$- $3\pi/2$. The phase comparator 38 is arranged to detect a phase difference between the reproduced pilot signal and the reference pilot signal and, upon detection of the difference, produces a tracking error signal. The tracking error signal is supplied to a capstan motor control circuit 39 to control the rotation of a capstan 40 for tracking control, which is accomplished in the following manner.

FIGS. 6(a), 6(b), 6(c) and 6(d) show the tracking control performed by the embodiment. Assuming that the pilot signal recorded in the track which is under tracking control is at the phase 0, then the phase of the pilot signal reproduced when the reproducing head is on the track coincides with that of the reference pilot signal as indicated by a vector Ba in FIG. 6(a). Further, in this instance, the head is located at a tracing position "a" as indicated in FIG. 5.

Figure 6A:
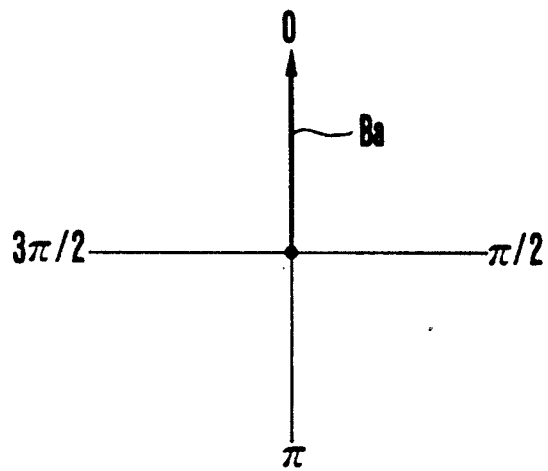
FIGS. 6(a)(b), 6(c) and 6(d) show tracking control to be performed by the digital VTR of FIG. 3.
Figure 6B:
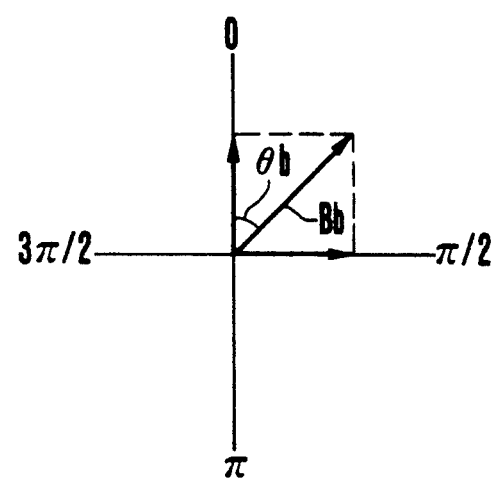

Next, assuming that the reproducing head is located at a position shifted by ½ track pitch to the right from the track under control as indicated by a head position "b" in FIG. 5, the phase of the reproduced pilot signal becomes as represented by a composite vector Bb between the pilot signal phase 0 and the pilot signal phase $\pi/2$ as shown in FIG. 6(b). The reproduced pilot signal thus comes to have a phase difference $\theta b$ ($=\pi/4$) from the reference pilot signal. Assuming that the tape is travelling in the direction of arrow Y as shown in FIG. 5, the phase comparator 38 supplies the capstan motor control circuit 39 with a negative level signal according to the degree of this phase difference $\theta b$. Then, the rotating velocity of the capstan 40 is lowered to bring the reproducing head closer to the track under control.

Figure 6C:
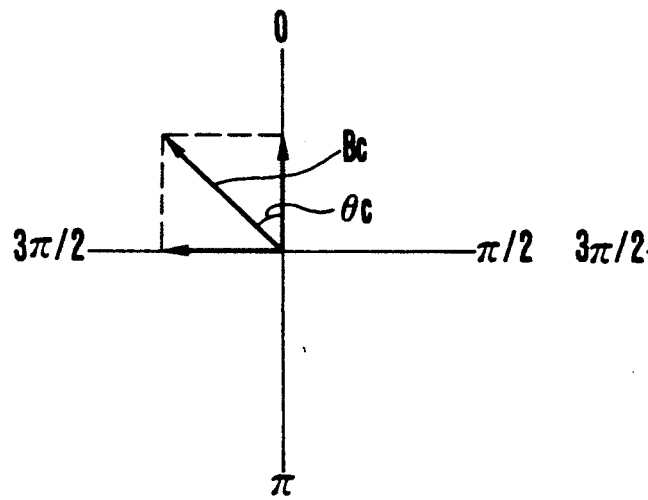

If the reproducing head is located at a point deviating by ½ track pitch to the left from the track under control as indicated by a head position "c" in FIG. 5, the phase of the reproduced pilot signal becomes as indicated by a vector Bc in FIG. 6(c). The phase comparator 38 then generates a positive level signal according to the phase difference $\theta c$. In accordance with this, the rotation velocity of the capstan 40 increases to bring the reproducing head closer to the track under control.

Figure 6D:
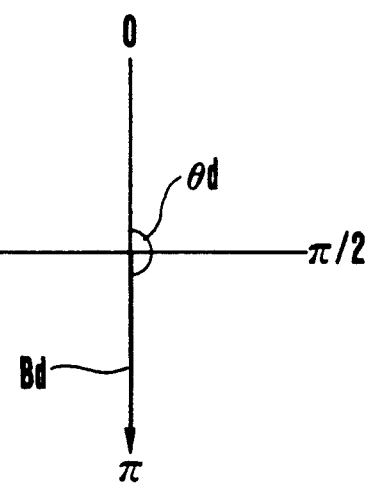

If the reproducing head is in a tracing position deviating by two track pitches from the track under control as indicated by a head position "d" in FIG. 5, the reproduced pilot signal has a difference ($\theta d$) of the phase $\pi$ from the reference pilot signal as indicated by a vector Bd in FIG. 6(d). The phase comparator 38 then produces a high level error voltage to bring the reproducing head closer to the track under control either by increasing or by decreasing the rotation velocity of the capstan 40.

In accordance with the arrangement of this embodiment, as described above, the digital VTR is capable of adequately performing tracking control by just superimposing the pilot signal of a single frequency on the recording signal. The digital signal is free from any restriction conventionally put on the band thereof. Further, compared with the conventional four-frequency type tracking control arrangement, the embodiment has a much smaller rate of occurrence of reproduction errors.

The tracking control method of this invention is not limited to the arrangement of the embodiment described but may be changed to have the pilot signal of a single frequency recorded not in all the tracks but only in such a part that will not be much affected by occurrence of errors.

Figure 7:
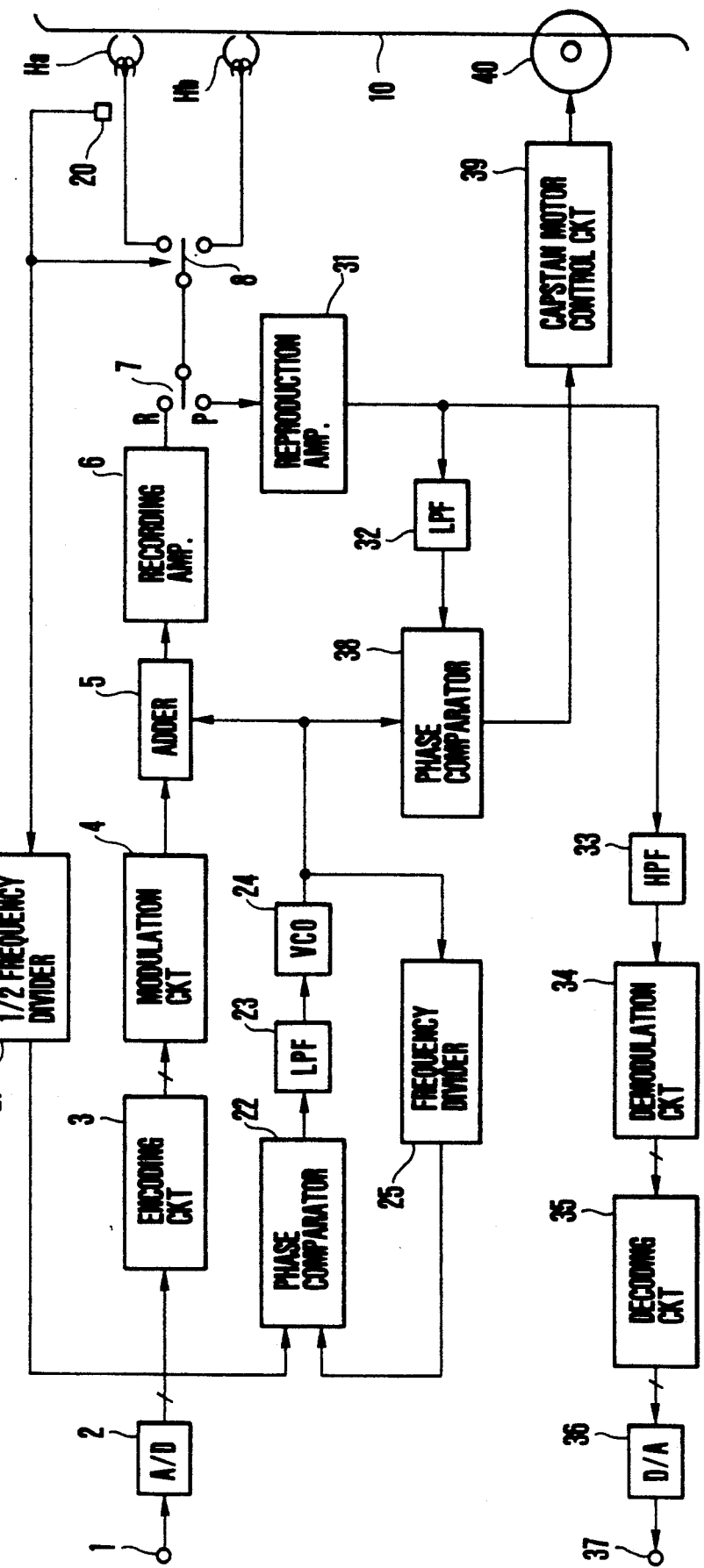
FIG. 7 is a block diagram showing a digital VTR arranged as another embodiment of this invention.

FIG. 7 shows in a block diagram a digital VTR arranged as another embodiment of this invention. In this drawing, the same component elements as those shown in FIG. 3 are indicated by the same reference numerals and the details of them are omitted from the following description. This VTR differs from the VTR of FIG. 3 in the pilot signal generating arrangement. The following description is limited to this difference.

A ½ frequency divider 27 is arranged to divide by ½ the above stated PG signal produced from the rotation phase detector 20. The output of this divider 27 is supplied to a phase comparator 22 which is included in a PLL circuit. The PLL circuit is composed of the phase comparator 22, an LPF 23, a voltage controlled oscillator (hereinafter referred to as VCO) 24 and a frequency divider 25. The VCO 24 is arranged to produce a sinusoidal wave shaped pilot signal which is phase locked with the output of the ½ frequency divider 21.

The VCO 24 is arranged to have a center frequency which is an odd number times as high as 15 Hz and is set, for example, at 49.995 KHz. Generally, if the recording period for one track is $1/f_D$ sec, the frequency fp of the pilot signal is set at $f_D \times (n+1/m)$, wherein n represents an integer and m an integer which is at least 3. In the case of this embodiment, $f_D=60$ and $m=4$. Therefore, the frequency of the pilot signal is an odd number times as high as 15 Hz. Accordingly, the frequency dividing ratio of the frequency divider 25 is $1/(nm+1)$. With the frequency of the pilot signal set in this manner, the phase of the pilot signal at the initial point of each track comes to shift by $\pi/2$ at a time. Generally, if $fp=f_D(n+1/m)$, the phase of the pilot signal at the initial point of each track shifts by $\pi/m$ at a time.

Further, the recording wave length of the pilot signal is arranged to be 1/an-integer of the shifting extent X from one track to an adjoining track as shown in FIG. 5. With a period of time required by the heads Ha and Hb in tracing a distance including the length of one track and shifting extent X to the adjoining track assumed to be 1/F sec, the pilot signal must satisfy a relation $fp=F \times (n'+1/m)$, wherein n' represents an integer and m an integer which is at least 3. Then, assuming that the m is 4, the recording pattern on the tape resulting from recording by the heads Ha and Hb becomes as shown in FIG. 5.

Further, the output of the VCO 24 is used also as a reference pilot signal for showing a reference phase with which the phase of the pilot signal reproduced during a reproducing operation is to be compared.

The VTR which is arranged as shown in FIG. 7 gives the same advantageous effect as the VTR of FIG. 3. In addition to that, the VTR of FIG. 7 has much simpler circuit arrangement.

Figure 8:
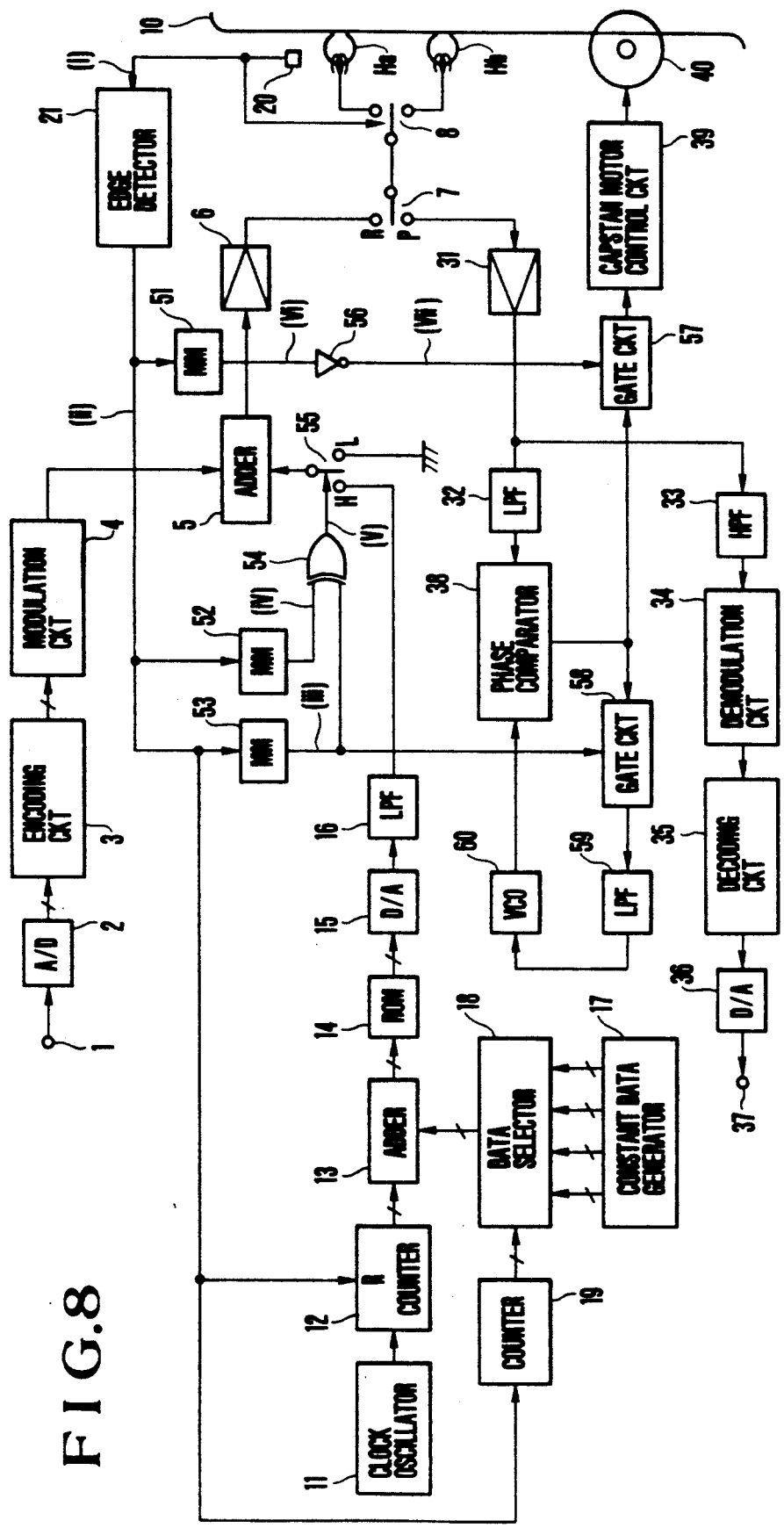
FIG. 8 is a block diagram showing a digital VTR arranged as a further embodiment of this invention.
Figure 9:
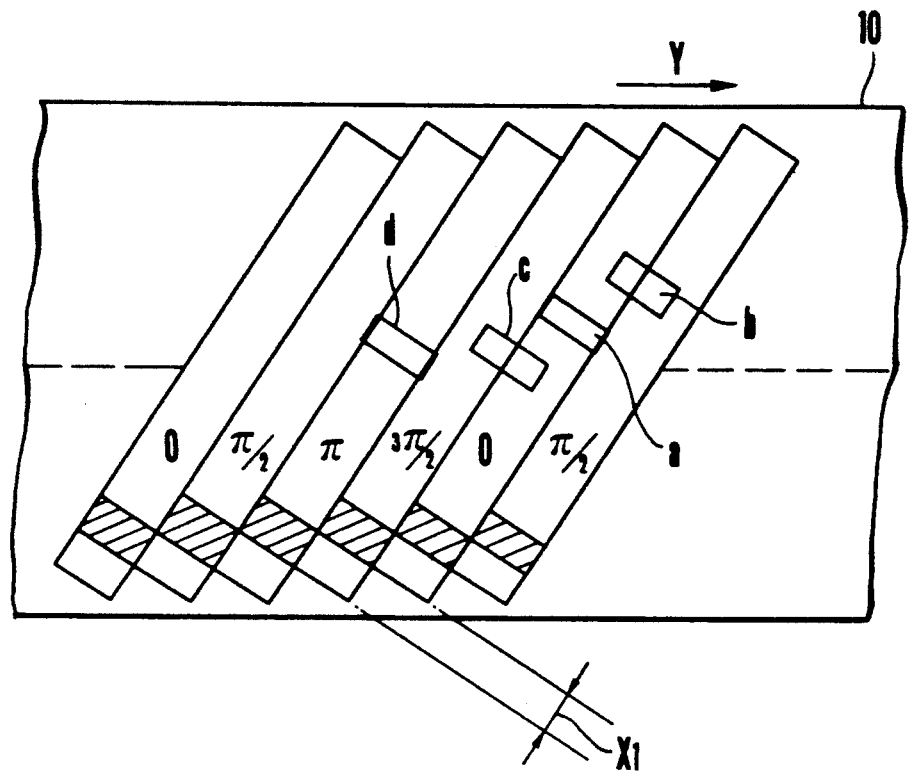
FIG. 9 shows the recording pattern of the digital VTR of FIG. 8.

FIG. 8 shows another VTR which is arranged also as an embodiment of this invention. FIG. 9 shows a recording pattern on a magnetic tape resulting from recording performed by the VTR of FIG. 8. In FIG. 8, component elements similar to those of FIG. 3 are indicated by the same reference numerals and the details of them are omitted from the following description.

The operation timing of a switch 55 is first described with reference to FIG. 9 as follows: In FIG. 9, reference symbols 0, $\pi/2$, x, $3\pi/2$ denote the different phases of the pilot signal. Hatched parts of FIG. 9 represent the parts of the tape 10 having no pilot signal recorded. A symbol X1 denotes a shifting extent between each track and another track adjoining thereto. The length in the longitudinal direction of each track of the part having no record of the pilot signal is equal to the shifting extent X1. With the head arranged to trace obliquely upward to the right, a distance from the initial tracing point to the part having no record of the pilot signal is also equal to the shifting extent X1.

Figure 10:
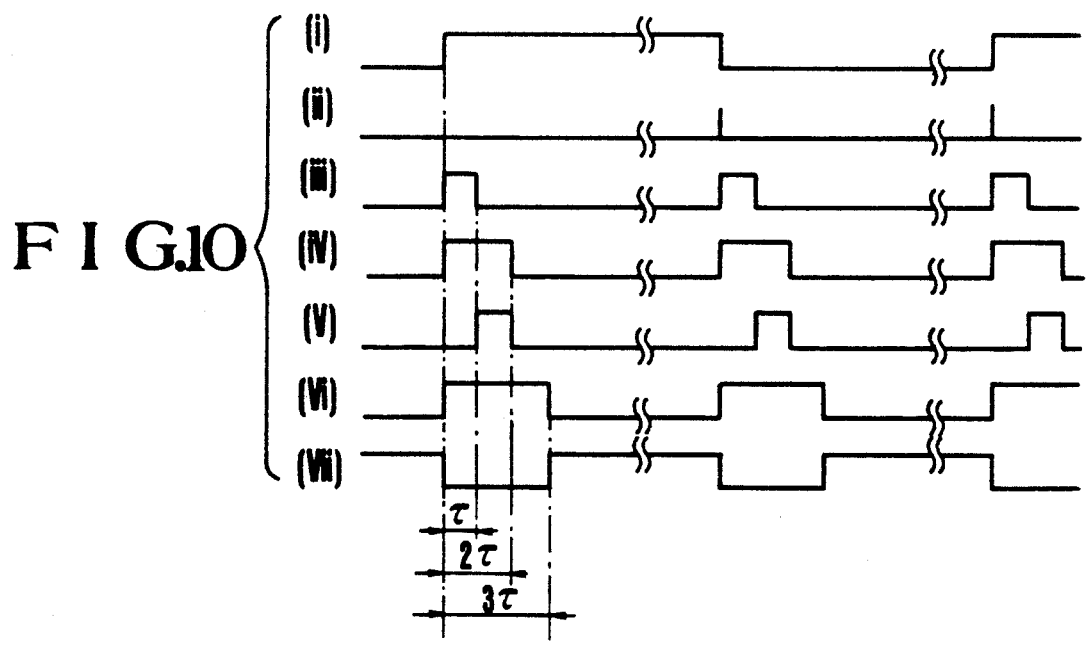
FIG. 10 is a timing chart showing the operation of the VTR of FIG. 8.

Referring to FIG. 10 which is a timing chart, a switch 55 which is provided for recording the pilot signal in a manner as shown in FIG. 9 is arranged as follows: A part (i) of FIG. 10 shows the PG signal. A part (ii) shows an edge detection pulse signal which is produced when the edges of the PG signal are detected is supplied to monostable multivibrators (hereinafter referred to as MMs for short) 52 and 53. The parts (iii) and (iv) of FIG. 10 show the outputs of the MMs 52 and 53. A period $\tau$ represents a stabilizing period of the MM 53. During this period $\tau$, the heads Ha and Hb traces the surface of the tape 10 as much as the above stated extent X1. The MM 52 requires a stabilizing period $2\tau$. An exclusive OR (hereinafter referred to as EXOR) circuit 54 is arranged to produce a pulse signal (v) as shown at a part (v) in FIG. 10. The connecting position of the switch 55 is on one side H when the pulse signal (v) is at a high level and is shifted to another side L when the signal (v) is at a low level. While the heads Ha and Hb are tracing the hatched parts (see FIG. 9), no pilot signal is supplied to the adder 5. The frequency of the pilot signal is determined, like in the case of the embodiment shown in FIG. 3, in such a manner that the recording wave length of the pilot signal is 1/an-integer of the shifting extent X1 between one track and a next one. Assuming that a period of time required in recording one track is 1/f, the frequency fp of the pilot signal is arranged to be $fp = f_T \times (i + \frac{1}{4})$, wherein i represents an integer, for the purpose of facilitating the operation of reproduction system which will be described later.

A PLL circuit which is arranged to generate a reference signal (hereinafter referred to as a reference pilot signal) which is used as reference in detecting the phase of a reproduced pilot signal is composed of a VCO 60, a phase comparator 38, an LPF 59 and a gate circuit 58. The PLL circuit operates as follows: The gate circuit 58 is arranged to gate the output of the phase comparator 38 only when the output (iii) of the above stated MM 53 is at a high level. When the output (iii) of the MM 53 is at a high level, the heads Ha and Hb are reproducing the pilot signal recorded immediately before the part having no record of the pilot signal as shown in FIG. 9. The pilot signal thus reproduced will never be affected by the pilot signal recorded in the adjacent tracks. Therefore, the reproduced pilot signal shows the phasic standard of the pilot signal record of the track. Accordingly, the PLL circuit is arranged to generate a reference pilot signal which is phase locked with the pilot signal gated by the gate circuit 58.

If the PLL circuit is very quickly responsive, it presents no problem. In the case of this embodiment, as described above, the phase of the reference pilot signal is arranged to be automatically shifted by $\pi/2$ at a time even if the VCO 60 does free running with the frequency fp of the pilot signal set at $(\frac{1}{4}+i) f_T$ and with the center frequency of the VCO 60 arranged to coincide with the frequency fp as mentioned in the foregoing. Therefore, any phase error gated by the gate circuit 58 results solely from a mechanical error. The PLL circuit is, therefore, capable of following the operation even if its responding speed is lowered to some degree.

The tracking control using this reference pilot signal is performed in the following manner. The track to be controlled changes from one to another among tracks having the pilot signal records of different phases in the order of 0 - $\pi/2$ - $\pi$ - $3\pi/2$ according as the phase of the reference pilot signal produced from the VCO 60 varies in the order of 0 - $\pi/2$ - $\pi$ - $3\pi/2$. The phase comparator 38 detects a phase difference between the reference pilot signal and the reproduced pilot signal obtained from an area representing a major portion of the applicable track and then produces the phase difference as a tracking error signal. The tracking error signal is supplied via a gate circuit 57 to a capstan motor control circuit 39. The circuit 39 then controls the rotation of a capstan 40 to perform thereby the tracking control. This gate circuit 57 is arranged to gate the output of the phase comparator 38 when a signal (vii) is at a high level. The signal (vii) is obtained as shown at a part (vii) of FIG. 10 by inverting with an inverter 56 the output (vi) of an MM 51 which is obtained with the MM 51 caused to trigger by the pulse signal ii produced from the above stated edge detector 21. The stabilizing period of the MM 51 is set at $3\tau$. Therefore, the phase error or tracking error signal is alone supplied from the gate circuit 57 to the capstan motor control circuit 39.

Figure 11:
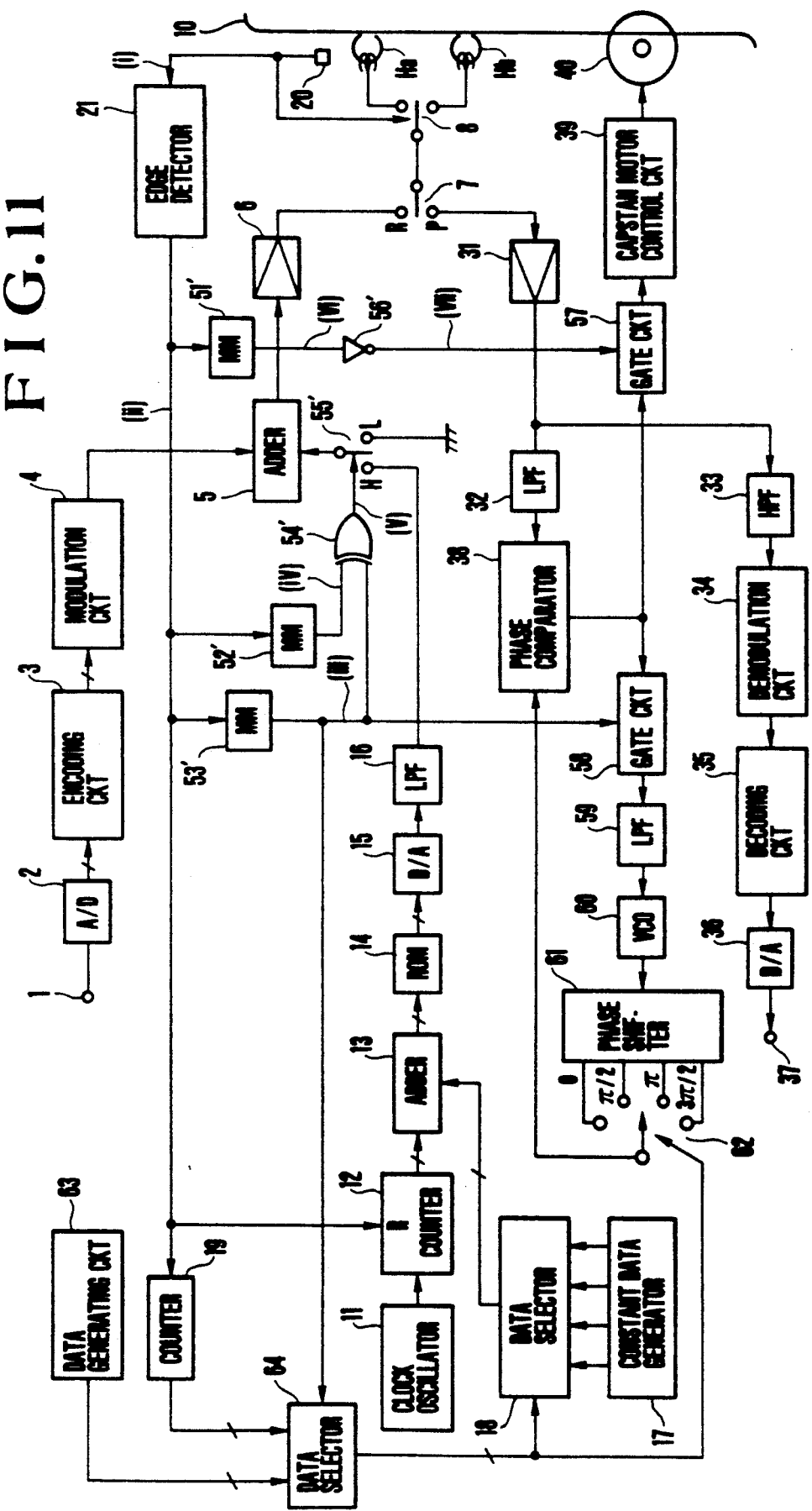
FIG. 11 is a block diagram showing a digital VTR arranged according to this invention as a further embodiment thereof.
Figure 12:
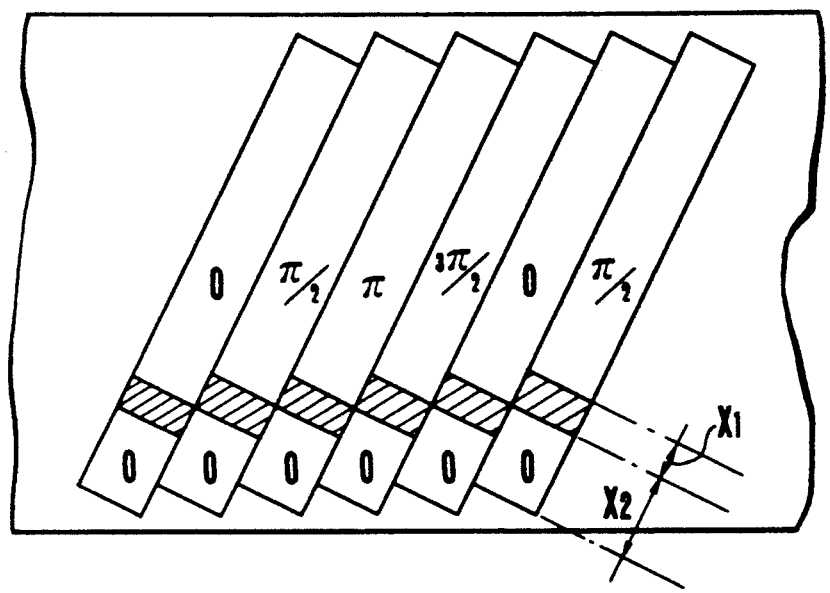
FIG. 12 shows the recording pattern of the digital VTR of FIG. 11.

FIG. 11 shows in a block diagram a digital VTR arranged as a further embodiment of this invention. FIG. 12 shows a recording pattern on a tape resulting from recording by the VTR of FIG. 11. In FIG. 11, component elements similar to those shown in FIG. 8 are indicated by the same reference numerals and the details of them are omitted from the following description.

As shown in FIG. 12, a pilot signal of a phase 0 is arranged to be recorded to a given length X2 in the beginning part of each track. Following this, a part having no pilot signal record is arranged to a length X1 as mentioned in the foregoing. Compared with the arrangement of FIG. 8, this arrangement provides a longer period of time for obtaining a reproduced pilot signal which is usable as a standard for the phase of a reference pilot signal.

Figure 13:
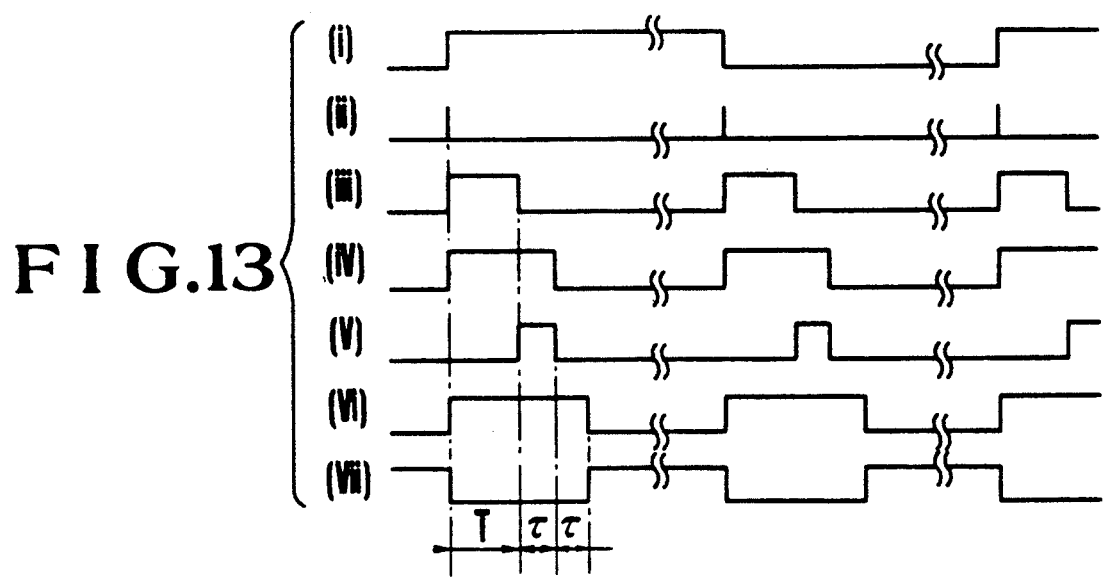
FIG. 13 is a timing chart showing the operation of the digital VTR of FIG. 11.

The arrangement of the embodiment for performing a recording operation as shown in FIG. 12 is described as follows with reference to FIG. 13 which is a timing chart. The stabilizing period of an MM 53' is set at a period of time T required by the heads Ha and Hb for tracing a distance X2 on the surface of the tape (see FIG. 12). A data selector 64 is controlled by the output of the MM 53'. The data selector 64 is arranged to select the output data of the above stated two-bit counter 19 or the output data of a data generating circuit 63 which is arranged to produce fixed data consisting of two bits. The data selector 64 produces the fixed data when the output level of the MM 53' is high. The fixed data is supplied to a data selector 18 to cause it to supply an adder 13 with a constant data which corresponds to the pilot signal of phase "0". This causes an LPF 16 to generate a pilot signal of phase "0" when the output of the MM 53' is at a high level. When the output of the MM 53' is at a low level, the LPF 16 produces a pilot signal the phase of which varies by $\pi/2$ for every track.

The stabilizing period of an MM 52' is set at $T+\tau$. Like in the case of FIG. 8, the output (v) of an EXOR 54' causes the connecting position of a switch 55' to be on one side L during a period of time $\tau$, during which no pilot signal is recorded. The recording pattern shown in FIG. 12 is obtained in this manner.

During reproduction, the embodiment performs tracking control in the following manner. A gate circuit 58 gates the output of the phase comparator 38 during the period of time T according to the output of the MM 53'. During this period, the pilot signal reproduced by the heads Ha and Hb is at the phase "0". The VCO 60 is arranged to generate a reference pilot signal which is phase locked with the pilot signal of phase "0". Meanwhile, the fixed data from the data generating circuit 63 is supplied from the data selector 64 to a switch 62. The switch 62 thus supplies the phase comparator 38 with a signal which is not phase shifted by a phase shifter 61. This enables the VCO 60 to generate a reference pilot signal at the phase 0. In this instance, like in the embodiment shown in FIG. 8, the frequency fp' of the pilot signal is preferably set at $jf_T$ (j: an integer) in consideration of the responsivity of the PLL circuit in such a manner that the reference pilot signal of phase "0" is obtainable even if the VCO comes to do free running. The center frequency of the VCO 60 is also set at $Jf_T$ accordingly.

While the pilot signal reproduced from the remaining part of the track is being supplied via the LPF 32 to the phase comparator 38, the switch 62 supplies, under the control of the output of the counter 19, the phase comparator 38 with the reference pilot signal which is phase shifted by a phase shifter 61 from one phase to another among phases 0, $\pi/2$, $\pi$ and $3\pi/2$. With the phase of the reference pilot signal thus shifted in the order of 0 - $\pi/2$ - $\pi$ - $3\pi/2$, the phase comparator 38 produces a tracking error signal in the same manner as in the case of the embodiment shown in FIG. 8. The tracking error signal is supplied to a gate circuit 57, which gates only the effective portion of the tracking error signal and supplies it to a capstan motor control circuit 39. The gate circuit 57 is arranged to gate the error signal when the signal (vii) obtained by inverting the output (vi) of the MM 51' which has its stabilizing period set at T+2$\tau$) is at a high level.

The embodiment of FIG. 11 which is arranged as described above permits free and arbitrary setting of the reference pilot signal pull-in time T, so that the reference pilot signal can be more stably generated.

Both the digital VTRs shown in FIGS. 8 and 11 are arranged to perform adequate tracking control by just superimposing the pilot signal of a single frequency upon the recording signal. In addition to the advantage of the embodiment shown in FIG. 3, these embodiments are capable of preventing the tracking control from being affected by the uneven degrees of mechanical precision among products by virtue of the arrangement made to determine the phase of the reference pilot signal on the basis of the reproduced pilot signal. More specifically, in the case of the embodiment shown in FIG. 3, the reference pilot signal is formed solely on the basis of the rotation phase of the rotary head. In that instance, it is possible that the reference pilot signal might fail to coincide with the reproduced pilot signal obtained from the track under control. That discrepancy then might appear as the difference represented by the tracking error signal. Whereas, the above stated two embodiments preclude such.

Figure 14:
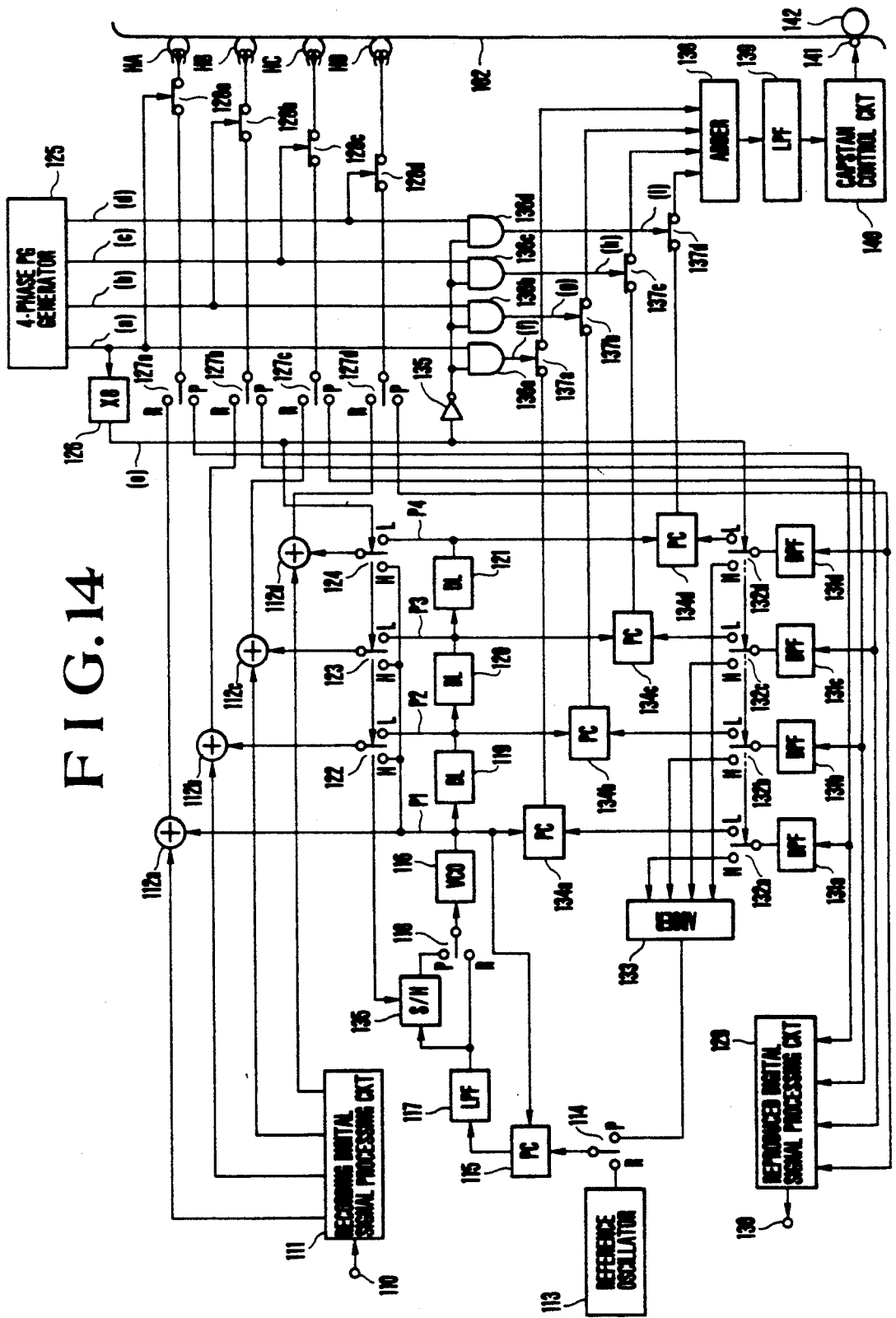
FIG. 14 is a block diagram showing in outline the arrangement of a digital VTR arranged as a further embodiment of this invention.
Figure 18A:
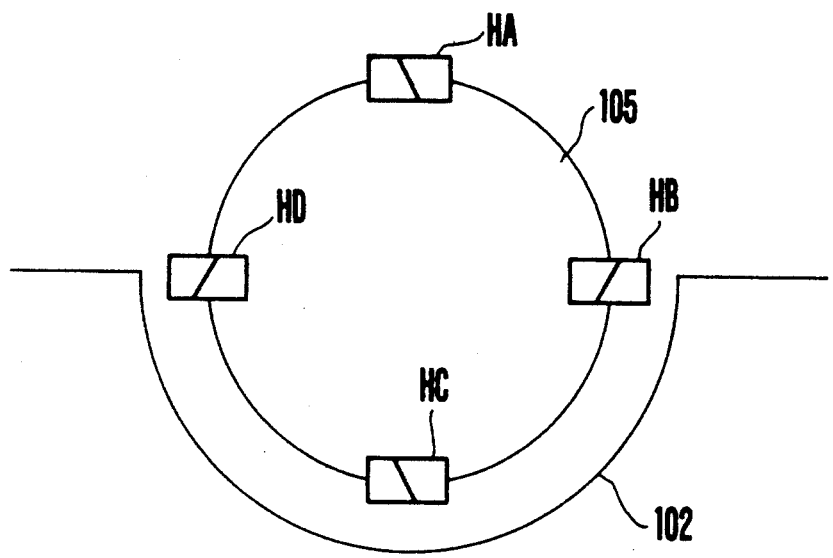
FIGS. 18(A) and 18(B) show the head arrangement of a digital VTR arranged as an embodiment of this invention.
Figure 18B:
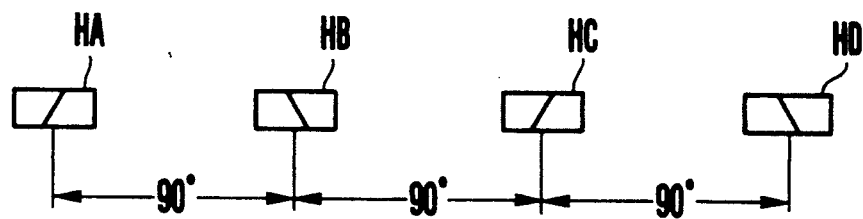

FIG. 14 shows a digital VTR arranged as a further embodiment of this invention. The head arrangement of the VTR is as shown in FIGS. 18(A) and 18(B), wherein reference symbols HA, HB, HC and HD respectively denote rotary video heads. These heads HA, HB, HC and HD are mounted on a rotary cylinder 105 at a phase difference of 90 degrees from each other. The heads HA and HC have an azimuth angle of $+\theta$ degrees while the heads HB and HD have an azimuth angle of $-\theta$ respectively. A magnetic tape 102 is wrapped at least 180 degrees round the cylinder 105. One field portion of a digital video signal is recorded in four tracks on the tape by the heads HA, HB, HC and HD while the cylinder 105 makes one turn. The cylinder 105 is arranged to make 60 turns per sec. Each of the tracks is formed in 1/120 sec.

FIGS. 15(A) and 15(B) show a recording pattern on the tape resulting from recording by the digital VTR of FIG. 14. Referring to FIG. 15(A), the heads trace the surface of the tape 102 in the direction of arrow 103. A pilot signal is recorded at varied phases p1, p2, p3 and p4, which differ 90 degrees from each other. The pilot signal is of a single frequency of about 50 KHz. The term "the phase of pilot signal" used herein means the pilot signal phase as obtained on the tape 102. In case that the pilot signal phase shifts 90 degrees in an adjoining track, the reproduced pilot signal phase also shifts 90 degrees when the pilot signal is reproduced by the same head. FIG. 15(B) shows in vectors an interrelation among the varied phases p1, p2, p3 and p4 of the pilot signal.

Referring to FIGS. 16(A) and 16(B), the principle of the tracking control operation of this embodiment is as follows: Assuming that the pilot signal recorded in a track under control is at the phase p1 and the pilot signal phases in two tracks adjacent to the track on both sides thereof are p2 and p4, if the head is in a just tracking state for the track under control, the composite phase vector of the pilot signal reproduced by the head coincides with the phase p1. If the head deviates from the track under control toward the track having the pilot signal record at the phase p2, the composite phase of the reproduced pilot signal becomes as indicated by a broken line Pm1 in FIG. 16(B). If the head position deviation is toward the other track having the record of the pilot signal at the phase P4, the composite vector becomes as indicated by another broken line Pm2.

Figure 17:
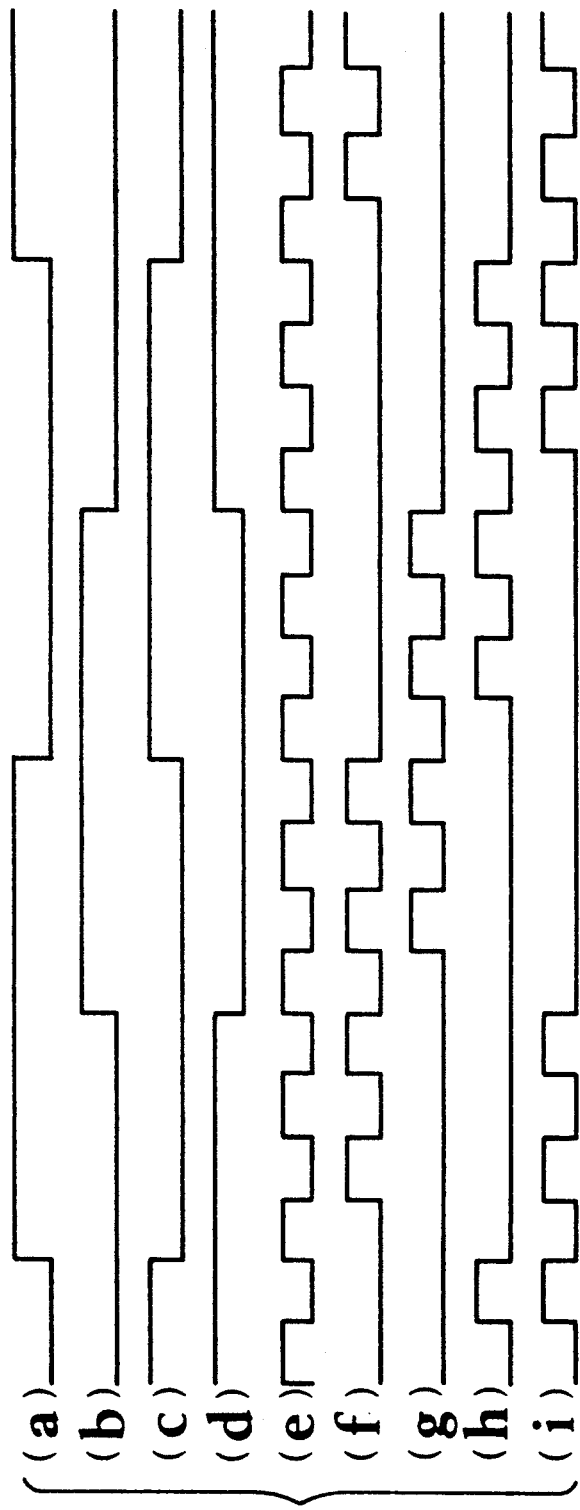
FIG. 17 is a timing chart showing the output wave forms of various part of FIG. 14.

FIG. 17 is a timing chart showing the wave forms of the outputs of various parts of FIG. 14.

A video signal which is received at a terminal 110 is subjected to a digital signal processing operation carried out at a recording digital signal processing circuit 111. One field portion of the video signal is divided into video signals of four channels. These video signals are produced one by one at a timing shifted by ¼ field period (or 1/240 sec). A reference oscillator 113 is arranged to generate a reference signal for determining the frequency of the pilot signal. The reference signal is supplied to a phase comparator (hereinafter referred to as PC) 115 via one side R of a switch 114. The PC 115 compares the phase of the reference signal with that of the output of VCO (voltage controlled oscillator) 116. The comparison output of the PC 115 is used to control the VCO 116 via LPF 117 and one side R of a switch 118.

Since the tracks are obliquely formed, there is some shifting extent between one track and another. The frequency of the above stated reference signal is arranged to have a wave length set at a value 1/an-integer of the shifting extent and also arranged to be an integer times as high as 240 Hz. If the signal of the same frequency and of the same phase is supplied to all the heads, the signal phase on the tape 102 would be unvarying between one track and another throughout the whole track area.

Each of delay circuits (DLs) 119, 120 and 121 is arranged to shift its input signal by ¼ wave length of the reference signal. The phases of the outputs of these delay circuits differ 90, 180 and 270 degrees from that of the output signal of the VCO 116 respectively. When the output of the VCO 116 is at the pilot signal phase p1, the output phases of the DLs 119, 120 and 121 become p2, p3 and p4.

A 4-phase PG signal generator 125 is arranged to generate four different pulse signals (PG) of wave forms as shown at parts (a), (b), (c) and (d) in FIG. 17 which indicate the recording or reproducing timing of the heads HA, HB, HC and HD on the basis of the rotation phase of the rotary cylinder 105 shown in FIG. 18(A). An 8-stepping-up device 126 which is operated by a PLL or the like is arranged to generate a signal of a frequency which is eight times as high as the PG signal and has a wave form as shown at a part (e) in FIG. 17. This signal (e) is used for controlling switches 122, 123 and 124. Under the control of the signal (e), the switch 122 produces the pilot signal by switching the phase of the pilot signal eight times between phases p1 and p2 while one track is formed on the tape. Other switches 123 and 124 likewise perform switching operation on the pilot signal phase between p1 and p3 and between p1 and p4 respectively.

The digital signals of four channels mentioned in the foregoing are mixed at mixers 112a, 112b, 112c and 112d with the pilot signal which is generated in the manner as described above. The mixed signals thus obtained are recorded by the heads HA, HB, HC and HD via the sides R of switches 127a, 127b, 127c and 127d and other switches 128a, 128b, 128c and 128d respectively. The switches 128a, 128b, 128c and 128d are arranged to be turned on and off by the PG signal pulses (a), (b), (c) and (d).

The pilot signal having varied phases as shown in FIG. 15(A) is thus recorded along with the digital video signal through the processes as described above.

The embodiment is arranged to perform a reproducing operation in the following manner: In this case, the connecting positions of the switches 127a, 127b, 127c and 127d are on their sides P. Reproduced signals are obtained from the heads HA, HB, HC and HD by controlling the switches 128a, 128b, 128c and 128d with the PG signal pulses (a), (b), (c) and (d). The reproduced signal of four channels thus obtained are supplied to a reproduced digital signal processing circuit 129 to be brought back into the original video signal. The video signal thus reproduced is produced from a terminal 130.

The reproduced signals of four channels are respectively supplied to BPFs 131a, 131b, 131c and 131d. These BPFs then separate the pilot signal components from the reproduced signals. As obvious from FIG. 15(A), the pilot signal reproduced from areas a1, a3, a5 and a7 are always at the phase P1. When the pulse signal (e) produced from the 8-stepping-up device 126 is at a high level, the heads HA, HB, HC and HD trace these areas a1, a3, 35 and 37. Therefore, if the connecting positions of the switches 132a, 132b, 132c and 132d are then set on their side H, the pilot signal supplied to the adder 133 is at the phase p1. Accordingly, the pilot signal produced from the adder 133 represents the average of the pilot signal components of the phase p1 reproduced by two heads. Phase differences due to head mounting errors then can be smoothened with the output of the adder 133 supplied to a PLL circuit which is composed of a PC 115, an LPF 117 and a VCO 116. However, since only an error signal obtained from the area from which the pilot signal of the phase P1 is reproduced is effective for the PC 115, this error signal is sampled and held by a sample-and-hold circuit (hereinafter referred to as an S/H circuit) 135. By this arrangement, the VCO 116 produces a reference signal of the phase p1 which is obtained with unevenness due to head mounting errors of the four heads smoothened while the DLs 119, 120 and 121 give reference signals of phases p2, p3 and p4 respectively.

If the PLL circuit is very quickly responsive, there is no problem. In the case of this embodiment, the frequency fp of the pilot signal is set at a value 4n (n: an integer) times as high as the rotation frequency $f_D$ of the rotary cylinder 105 and the center frequency of the VCO 116 is also set at the value fp. By this, the reference pilot signal produced from the VCO 116 is arranged to be always at the phase p1 even in the event of free running of the VCO 116. Therefore, any phase error made at the PC 115 results solely from a mechanical error of the apparatus. The PLL circuit is, therefore, capable of following the operation even if its responding speed is allowed to be somewhat slow.

Meanwhile, the pilot signal components separated from the signal being reproduced from other areas a2, a4, a6 and a8 by the heads HA, HB, HC and HD are produced through the terminals on the sides L of switches 132a, 132b, 132c and 132d. The phases of these reproduced pilot signal components vary according as the head position deviates from the track under control. Assuming that the pilot signal phases of are in a relation as shown in FIG. 15(B), the phase the reproduced pilot signal shifts clockwise if each head deviates from the track under control to the right as viewed on FIG. 15(A) and shifts counterclockwise if the deviation takes place to the left.

Therefore, a tracking error signal can be obtained with the phase comparison performed by PCs 134a, 134b, 134c and 134d between the pilot signal of the track under control and the reproduced pilot signal. In this instance, only an error signal that is obtained while the heads HA, HB, HC and HD are tracing the areas a2, 24, a6 and a8 is effective and usable. In view of this, signals which show the timing in this connection are formed through an inverter 135 and AND gates 136a, 136b, 136c and 136d to have wave forms as represented at parts (f), (g), (h) and (i) in FIG. 17. Then, gates 137a, 137b, 137c and 137d are controlled by these signals. This arrangement enables an adder 138 to receive valid tracking error signals only. The output of the adder 138 is supplied via an LPF 139 to a capstan control circuit 140. In response to this, the circuit 140 controls the travel of the tape 102 effected jointly by a capstan 141 and a pinch roller 142. The digital VTR arranged in the manner as described above is capable of performing adequate tracking control by just superimposing the pilot signal having a single frequency. Therefore, it allows a digital video signal to have a wide band. Further, since the reference phase which is used in forming the error signal is obtained on the basis of signal components obtained from varied parts in the transverse direction of the tape, any adverse effect of jitter brought about on the tracking error signal during reproduction due to the rotary heads can be lessened. Since the phase of the pilot signal recorded on the track under control for each head is arranged to be always the same, the switching circuit system can be simplified in the circuit arrangement. Since the tracking error signal is formed by using signals reproduced by all the heads, any problem that results from uneven mounting positions of the heads is avoidable so that an adequate tracking control signal can be obtained.

Figure 19:
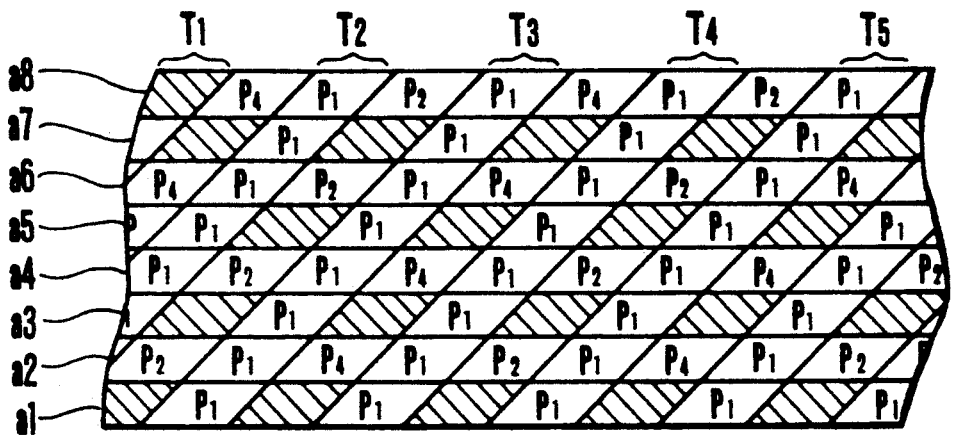
FIGS. 19 to 25 show different phasic arrangement of pilot signals recorded on a tape.
Figure 20:
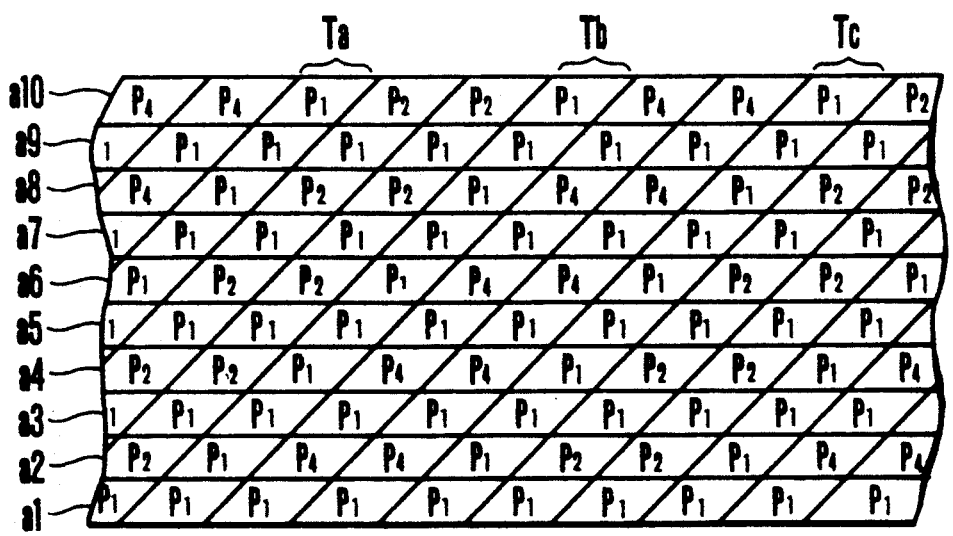

Further, the tracking control method of this invention can be carried out not only by the pilot signal allocation made in the embodiment described but also by some different pilot signal allocation. For example:

FIGS. 19 and 20 respectively show such different pilot signal allocations on the tape. In these drawings, reference symbols P1, p2, p3 and p4 denote the same things as those of FIG. 15(A). Blank parts indicate parts having no pilot signal record. In the case of FIG. 19, tracks T1, T2, T3, T4, T5, - - - can be used for tracking control. The track to be used for control is located at every two tracks and is arranged to have only the pilot signal of the phase p1. The pilot signal is recorded at phases p2 and p4 in the areas a2, a4, a6 and a8 in the two tracks which adjoin the controlling track on both sides thereof. In this case, the reference phase is detected from signals reproduced by the heads from the areas a1, a3, a5 and a7 of the track to be controlled. Then, a tracking control signal is obtained from signals reproduced from other areas a2, a4, a6 and a8. In this case, however, the direction indicated by a tracking error signal obtained from the track under control reverses every time the track changes from one over to another. This necessitates some suitable arrangement for inverting the tracking error signal by an inverting amplifier or the like.

In the event of the recording pattern shown in FIG. 20, each track is divided in the direction of width of the tape into ten areas a1 to a10. The tracks Ta, Tb, Tc, - - - to be used for tracking control are located at every three tracks. The pilot signal recording pattern is in a cycle of six tracks. This recording pattern suits for recording a digital video signal with six heads.

Figure 21:
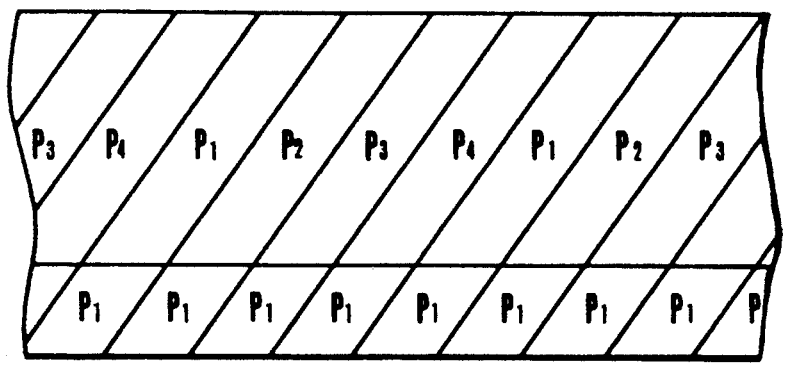
Figure 22:
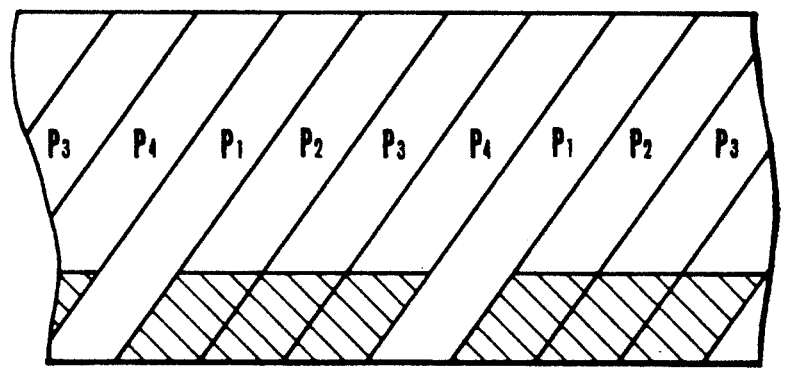
Figure 23:
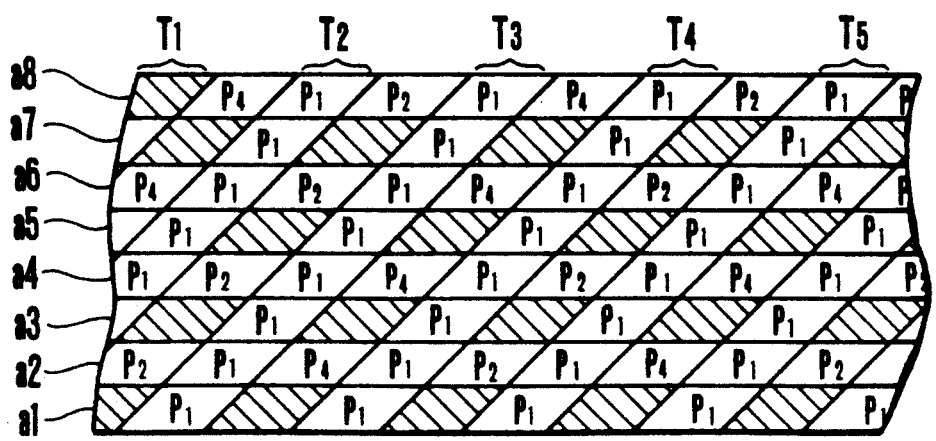

FIGS. 21 to 23 show pilot signal allocations to be made in cases where one field portion of a video signal is divided into four channels and recorded in four tracks. In these drawings, reference symbols p1, p2, p3 and p4 denote the same things as those of FIG. 15(A). Hatched parts indicate parts having no pilot signal record.

In the recording pattern of FIG. 21, the lower end part of each track always has the pilot signal of phase p1 recorded therein. The remaining part of the track occupying the major portion thereof has the pilot signal recorded at one of different phases p1, p2, p3 and p4 in rotation for every track. Tracking control with this recording pattern is performed as follows: A reference pilot signal is formed on the basis of the pilot signal of the phase p1 reproduced from the lower end of each track. Tracking control is then performed on the basis of a phase difference between this reference pilot signal and the pilot signal reproduced from other part. Compared with the recording pattern of FIG. 15(A), this pilot signal allocation is inferior in reliability of the phase of the reference pilot signal for the upper end part of the track. On the other hand, however, this method enables the VTR to obtain the tracking control signal almost from the whole track area and is, therefore, highly suited for tracking control over tracks having deteriorated linearity.

In the recording pattern of FIG. 22, the pilot signal is recorded in the lower end parts of the tracks only for every fourth track. Meanwhile, the pilot signal is recorded in other parts of all the tracks at different phases p1, p2, p3 and p4 one by one in rotation in the same manner as in the case of FIG. 21. The reference pilot signal is formed solely from the signal reproduced from the lower end part of the track. Tracking control is performed on the basis of a phase difference between the reference pilot signal and the pilot signal reproduced from other parts of the tracks. In this instance, although the reliability of the phase of the reference pilot signal is low for every track that has the pilot signal recorded at the phase p4 therein, the recording pattern of FIG. 22 much simplifies circuit arrangement than the recording pattern of FIG. 21 as the pilot signal is recorded only in one kind by all the heads.

In the case of the recording pattern of FIG. 23, the tracks to be used for tracking control are tracks T1, T2, T3, T4, T5, - - - which are arranged to be every other track. The pilot signal is recorded only at the phase p1 in each of the tracks to be used for tracking control. The pilot signal is recorded at phases p2 and p4 in the areas a2, a4, a6 and a8 of other tracks which are adjacent to each of the tracking control tracks on both sides thereof. In other words, a reference pilot signal is formed using the pilot signal reproduced from the different areas a1, a3, a5 and a7 of the head tracing the track under tracking control; and a tracking control (or error) signal is obtained on the basis of a phase difference between the reference pilot signal and a reproduced pilot signal obtained from each of the above stated areas a2, a4, a6 and a8. In this case, since the direction of any error indicated by the tracking error signal reverses every time the track under control changes from one track over to another, the tracking error signal must be inverted as necessary by means of an inverting amplifier or the like.

All the embodiments described in the foregoing are arranged to record a video signal by dividing one field portion of the signal into four tracks. However, the dividing number of tracks, that is, the number of channels of the information signal, is not limited to four but may be set otherwise as desired. Some other embodiments of this invention are arranged to cyclically record an information signal in six channels instead of four, for example, as shown by different recording patterns in FIGS. 24 and 25.

Figure 24:
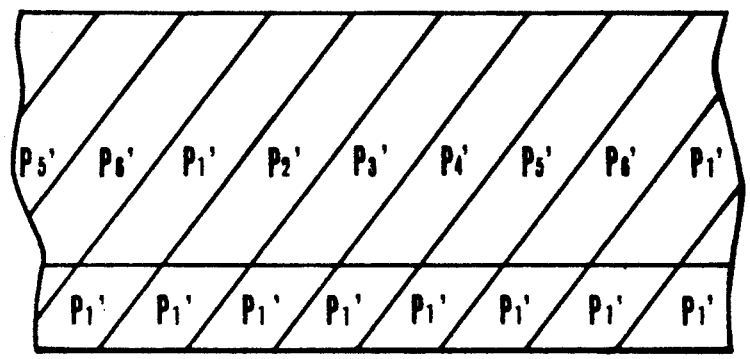

Referring to FIG. 24, the pilot signal is recorded on a recording medium at six different phases p1', p2', p3', p4', p5' and p6' which differ 60 degrees from each other. In the recording pattern of FIG. 24, the pilot signal recorded in the lower end part of each track is at the phase p1'. A reference pilot signal is formed using the phase p1' of the pilot signal reproduced from the lower end part. Tracking control is then carried out in the same manner as in the case of FIG. 21. Although the arrangement to have a pilot signal phase difference of 60 degrees between adjacent tracks results in a lower S/N ratio than in the case of phase difference of 90 degrees, the embodiment likewise performs tracking control.

The information signal of six channels can be cyclically recorded with the above stated pilot signal phases of p1, p2, p3 and p4. An example of arrangement for that is as represented by a recording pattern shown in FIG. 25.

Figure 25:
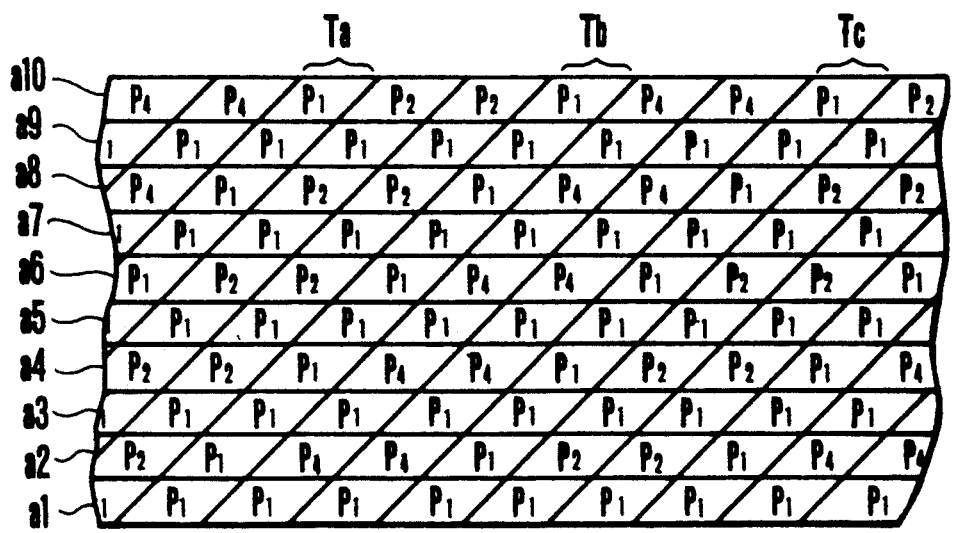

In the case of the recording pattern of FIG. 25, each track is divided into ten area a1 to a10 in the direction of tape width. Every third track is arranged to be used for tracking control. In this pattern, the pilot signal is recorded in a six track cycle, which is suited for a case where a digital video signal is to be recorded with six heads.

In cases where an information signal which is in an n channels and is recorded in an n track cycle (n: $\geq 2$) on a recording medium is to be reproduced, the arrangement of these embodiments described enables each of the heads to trace the medium in an adequate tracking state for the information signal of any of the channels as desired.

What is claimed is:
1. A tracking control system comprising:
(a) a pilot signal generating means for generating a pilot signal having a predetermined frequency;

(b) n rotary recording heads for recording an information signal and said pilot signal on n adjacent tracks among a plurality of parallel tracks on a recording medium, n being an integer equal to 2 or more;

(c) phase control means for controlling a phase of said pilot signal fed to said n heads in such a manner that in relation to the phase of said pilot signal recorded on one track among said plurality of tracks, the phases of the pilot signals recorded in two adjoining tracks on both sides of said one track are shifted to the same phasic degrees in opposite directions at positions aligned in a direction perpendicular to a longitudinal direction of said plurality of tracks and that the phase of the pilot signal recorded in said plurality of tracks is repeated at (n×i) track period at the positions aligned in the direction perpendicular to the longitudinal direction of said plurality of tracks, i being an integer equal to one or more, said phase control means including delay means comprised of (n−1) serially connected delay circuits each of which has a predetermined delay time, the delay means receiving the pilot signal generated by said pilot signal generating means;

(d) n reproducing heads for reproducing said information signal and said pilot signal from said recording medium;

(e) reference signal generating means for generating a reference signal having same frequency as that of said pilot signal; and (f) tracking control means for controlling positions of said n reproducing heads relatively to a position of said recording medium, on the basis of a phase difference between said pilot signal reproduced by at least one of said n reproducing heads and said reference signal.

2. A system according to claim 1, wherein the delay time of said delay circuits is a time corresponding to the phase difference of (360/n) degree of said pilot signal.

3. A tracking control system, comprising:
(a) pilot signal generating means for generating a pilot signal having a predetermined frequency;
(b) n rotary recording heads for recording an information signal and said pilot signal on n adjacent tracks among a plurality of parallel tracks, n being an integer equal to 2 or more;
(c) phase control means for controlling a phase of said pilot signal fed to said n heads in such a manner that in relation to the phase of said pilot signal recorded on one track among said plurality of tracks, the phases of the pilot signals recorded in two adjoining tracks on both sides of said one track are shifted to the same phasic degrees in opposite directions at positions aligned in a direction perpendicular to a longitudinal direction of said plurality of tracks and that the phase of the pilot signal recorded in said plurality of tracks is repeated at (n×i) track period at the positions aligned in the direction perpendicular to the longitudinal direction of said plurality of tracks, i being an integer equal to one or more;
(d) n reproducing heads for reproducing said information signal and said pilot signal from said recording medium;
(e) reference signal generating means for generating a reference signal having same frequency as that of said pilot signal; and
(f) tracking control means for controlling positions of said n reproducing heads relatively to a position of said recording medium, on the basis of a phase difference between said pilot signal reproduced by at least one of said n reproducing heads and said reference signal, said tracking control means including n phase-difference detecting circuits for generating level detecting signals corresponding to the phase difference between n channels of said pilot signals reproduced by said n reproducing heads, respectively, and said reference signal and an adding circuit for adding the n detecting signals outputted from said n phase-difference detecting circuits.

4. A system according to claim 3, wherein said reference signal generating means is arranged to feed n channels of reference signals having different phases from each other to said n phase-difference detecting circuits.

5. A system according to claim 3, wherein said reference signal generating means is arranged to generate said reference signal by using said pilot signal reproduced by at least one of said n reproducing heads.

6. An information signal recording apparatus, comprising:
(a) pilot signal generating means for generating a pilot signal having a predetermined frequency;
(b) mixing means for mixing an information signal and said pilot signal to generate a mixed signal;
(c) n rotary recording heads for recording said mixed signal, on n adjacent tracks among a plurality of parallel tracks on a recording medium, n being an integer equal to 2 or more; and
(d) phase control means for controlling a phase of said pilot signal fed to said n heads in such a manner that in relation to the phase of said pilot signal recorded on one track among said plurality of tracks, phases of said pilot signal recorded in two adjoining tracks on both sides of said one track are shifted to the same phasic degrees in opposite directions to each other at positions aligned in a direction perpendicular to a longitudinal direction of said plurality of tracks and that the phase of the pilot signal recorded in said plurality of tracks is repeated at (n×i) track period at the positions aligned in the direction perpendicular to the longitudinal direction of said plurality of tracks, i being an integer equal to one or more, said phase control means including delay means comprised of (n−1) serially connected delay circuits each of which has a predetermined delay time, which receives the pilot signal generated by said pilot signal generating means.

7. An apparatus according to claim 6, further comprising:
n reproducing heads for reproducing said information signal and said pilot signal from said recording medium;
reference signal generating means for generating a reference signal having same frequency as that of said pilot signal; and
tracking control means for controlling the positions of said n reproducing heads relative to the position of said recording on the basis of a phase difference between said pilot signal reproduced by at least one of said n reproducing heads and said reference signal.

8. A reproducing apparatus for reproducing an information signal from a recording medium having a plurality of parallel tracks formed thereon to record the information signal and a pilot signal having a predetermined frequency, in which in relation to a phase of said pilot signal recorded in one track among said plurality of tracks, phases of both pilot signal recorded in two adjoining tracks on both sides of said one track are shifted to same phasic degrees in opposite directions at positions aligned in a direction perpendicular to a longitudinal direction of said plurality of tracks and that the phase of the pilot signal recorded in said plurality of tracks is repeated at (n×1) track period at the positions aligned in the direction perpendicular to the longitudinal direction of said plurality of tracks, n being an integer equal to 2 or more and i being an integer equal to 1 or more, comprising:

(a) n reproducing heads for reproducing said information signal and said pilot signal from said recording medium;

(b) reference signal generating means for generating a reference signal having same frequency as that of said pilot signal; and (c) tracking control means for controlling the position of said n reproducing heads relatively to a position of said recording medium on the basis of a phase difference between said pilot signal reproduced by at least one of said n reproducing heads and said reference signal, said tracking control means including n phase-difference detecting circuits for generating level detecting signals corresponding to the phase difference between n channels of pilot signals reproduced by said n reproducing heads, respectively, and said reference signal and an adding circuit for adding the n detecting signals outputted from said n phase-difference detecting circuits.

* * * * *